United States Patent [19]

Ikeda et al.

[11] Patent Number: 6,111,586
[45] Date of Patent: *Aug. 29, 2000

[54] ELECTRONIC PHOTO ALBUM EDITING APPARATUS

[75] Inventors: Hisayoshi Ikeda; Junko Shiraha; Keiko Takeda, all of Kawasaki; Akifumi Hirose, Oita; Matsudou Takahashi, Oita; Miyuki Hieda, Oita, all of Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/802,849

[22] Filed: Feb. 19, 1997

[30] Foreign Application Priority Data

Mar. 15, 1996 [JP] Japan ..................... 8-058996

[51] Int. Cl.$^7$ .................................................. G06F 15/00
[52] U.S. Cl. ............................................................ 345/433
[58] Field of Search ..................... 345/334, 433, 345/418; 358/335, 906

[56] References Cited

U.S. PATENT DOCUMENTS 4,888,648 12/1989 Takeuchi et al. ................. 358/335
5,708,826 1/1998 Ikeda et al. ....................... 395/762

FOREIGN PATENT DOCUMENTS 60-190078 9/1985 Japan .
7093520 4/1995 Japan .

*Primary Examiner*—Phu K. Nguyen
*Attorney, Agent, or Firm*—Staas & Halsey, LLP

[57] ABSTRACT

An electronic photo album editing apparatus in which photo images are set on a mount displayed on a screen of a display unit so that an electronic photo album can be edited. The electronic photo album editing apparatus includes an image reading unit for reading photo images. The editing apparatus also includes an input unit for inputting the photo images read by the image reading unit and for setting a name of a photo group to which the photo images belong and a management unit for managing to what photo group the photo images input by the input unit belong. Further, a display controller for causing, with reference to information obtained by the management unit, photo images belonging to a specified photo group to be displayed on the screen and an editing unit for editing an electronic photo album using photo images displayed on the screen are also included in the electronic photo album editing apparatus.

16 Claims, 32 Drawing Sheets

FIG. 7

| PHOTO-BOX ID | PHOTO POINTER | USED/UNUSED |
|---|---|---|
| A | P 0 1 | UNUSED |
| B | P 0 2 | USED |
| | | |

FIG. 8

| COMPONENT-BOX ID | KIND OF COMPONENT | COMPONENT POINTER |
|---|---|---|
| a | MOUNT | P A 0 1 |
| b | COMPONENT | P A 0 2 |
| c | PHOTO FRAME | P A 0 3 |
| | | |

| TITLE OF ALBUM | PAGE | ALBUM DATA |
|---|---|---|
| × | 1 | POINTER INFORMATION |
| | | MOUNT INFORMATION |
| | | COMPONENT INFORMATION |
| | | CHARACTER INFORMATION |
| | | TRIMMING INFORMATION |
| | | PEN-SHEET INFORMATION |
| | | SOUND-SHEET INFORMATION |
| | | ⁀ |
| | 2 | ⁀ |
| | ⁀ | ⁀ |
| | ⁀ | ⁀ |

95 PEN-SHEET

96 SOUND DATA

FIG. 19

PLEASANT KYUSHU TOUR

113 — LIST OF PHOTO-BOX
114 — LIST OF COMPONENT-BOX

DIARY MOUNT
COLOR MOUNT
SEASON COMPONENT
PHOTO FRAME
ANIMAL

115

70

| 116 | 122 |
| 117 | 123 |
| 118 | 124 |
| 119 | 125 |
| 120 | 126 |
| 121 | 127 |
|     | 128 |

FIG.34

| DATA DIRECTORY | ALBUM MANAGEMENT FILE | |
| --- | --- | --- |
| | ALBUM DIRECTORY | ALBUM INFORMATION FILE |
| | | VOICE FILE |
| | | PEN SHEET FILE |
| | ALBUM DIRECTORY (FOR EACH PHOTO ALBUM)<br>·<br>·<br>· | |
| | PHOTO MANAGEMENT FILE | |
| | PICTURE DIRECTORY | PHOTO FILE |
| | | MINIATURE FILE |
| | | ·  (PHOTO FILE &<br>·    MINIATURE FILE)<br>·<br>· |
| | COMPONENT MANAGEMENT FILE | |
| | COMPONENT DIRECTORY | COMPONENT FILE |
| | | MINIATURE FILE |
| | | ·  (COMPONENT FILE &<br>·    MINIATURE FILE)<br>·<br>· |

FIG.35

| ALBUM DIRECTORY NAME AND ALBUM TITLE FOR EACH ALBUM | ALBUM TITLE |
| --- | --- |
|  | ALBUM DIRECTORY NAME |
|  | MANAGEMENT STATE |
|  | ⋮ (TITLE AND DIRECTORY NAME FOR EACH ALBUM) |

FIG.36

| ALBUM INFORMATION FOR EACH ALBUM | SCREEN SIZE (SOLUTION OF SCREEN) | | |
|---|---|---|---|
| | AUTO-DEMO TIME | | |
| | PAGE INFORMATION FOR EACH PAGE | SIZE OF INFORMATION FOR ONE PAGE | |
| | | FILE NAME FOR VOICE | |
| | | FILE NAME FOR PEN SHEET | |
| | | MOUNT INFORMATION | TYPE OF MOUNT |
| | | | FILE NAME FOR MOUNT |
| | | PHOTO INFORMATION | FILE NAME FOR PHOTO IMAGE |
| | | | PHOTO-CD |
| | | | POSITION AND SIZE ON PAGE |
| | | | TRIMMING INFORMATION |
| | | COMPONENT INFORMATION | FILE NAME FOR COMPONENT |
| | | | POSITION AND SIZE ON PAGE |
| | | CHARACTER INFORMATION | POSITION ON PAGE |
| | | | COLOR, FONT, STYLE AND SIZE |
| | | | CHARACTER STRING |

ELECTRONIC PHOTO ALBUM EDITING APPARATUS

BACKGROUND OF THE INVENTION (1) Field of the Invention

The present invention generally relates to an electronic photo album editing apparatus which is provided in a computer system, and more particularly to an apparatus for editing an electronic photo album in which photo images corresponding to photo data are set on a mount displayed on a screen of a display unit.

(2) Description of the Related Art

In recent years, electronic photo album editing apparatuses which edit electronic photo albums in computer systems have been commercialized. To improve utility of the electronic photo album, it is necessary to be capable of editing the electronic photo album in compliance with user's wishes.

A conventional electronic photo album editing apparatus is provided with photo data from a photo-CD. The photo-CD is a compact disk in which photo data corresponding to photo images is recorded. The photo data is read out of the photo-CD and processed so that photo images corresponding to the photo data are set on a mount displayed on a display screen of the computer system.

In response to user's editing operations, photo images and figure components showing seasons etc. are enlarged, reduced, moved and rotated, and then set on the mount displayed on the display screen. Characters can also be set on the mount. The outlines of photo images set on the mount can be modified by trimming. The photo images, figure components and characters can be deleted from the mount.

In an enlarging/reducing process in the conventional electronic photo album editing apparatus, the photo images and figure components set on the mount are not distinguished from each other. That is, the photo images and figure components are enlarged and reduced in the same enlarging/reducing manner which has been prepared in the computer system for the electronic photo album editing apparatus.

In moving and rotating processes, only objects which are specified in the photo images and figure components set on the mount are moved and rotated.

In a character setting process, when characters are specified by keyboard operations, the characters having a font style prepared in the computer system are set on the mount.

If a enlarging/reducing request is supplied after the outline of a photo image is modified by trimming, the trimming-modified photo image is enlarged and reduced.

In a deleting process, when an object is specified in the photo images and figure components (decorative components) set on the mount by mouse operations, the system does not inform a user that the specified object will be deleted. The specified object is then deleted from the mount in accordance with a deleting instruction.

In the conventional electronic photo album editing apparatus as described above, photo images corresponding to photo data which is not recorded in the photo-CD can not be inserted in the electronic photo album. Photo images corresponding to photo data items which are recorded in different photo-CDs are not inserted in the same electronic photo album.

In addition, it is difficult to enlarge and reduce photo images and figure components in different enlarging/reducing operations. For example, it is difficult to enlarge and reduce only photo images without changing a ratio of length to width and enlarge and reduce only figure components such that the ratio of length to width is changed.

Various operations are required in order to move or rotate a photo image together with a figure component with which the photo image overlaps. That is, although the photo image overlaps with the figure component (e.g., a photo frame component), an operation for selecting the photo image as an object to be moved or rotated and an operation for selecting the figure component as an object to be moved or rotated have to be separately performed.

Hand-written characters and handwritten figure components can not be set on the mount of the photo album.

If a enlarging request is supplied after the outline of a photo image is modified by trimming, the trimming-modified photo image is enlarged. Thus, indentation of the outline of the trimming-modified photo image are enlarged.

When an object to be deleted is specified by mouse operations, the system does not inform a user that the specified object will be deleted before the specified object is actually deleted in accordance with a deleting instruction. Thus, there may be a case where the object is deleted by mistake.

As has been described above, in the conventional electronic photo album editing apparatus, it is difficult to edit the electronic photo album in compliance with user's various wishes.

SUMMARY OF THE INVENTION

Accordingly, a general object of the present invention is to provide a novel and useful electronic photo album editing apparatus in which the disadvantages of the aforementioned prior art are eliminated.

A specific object of the present invention is to provide an electronic photo album editing apparatus which can easily edit the electronic photo album in compliance with user's various wishes.

The above objects of the present invention are achieved by an electronic photo album editing apparatus formed in a computer system in which photo images are set on a mount displayed on a screen of a display unit so that an electronic photo album is edited, the electronic photo album editing apparatus comprising: image reading means for reading photo images; input means for inputting the photo images read by the image reading means and for setting a name of a photo group to which the photo images belong; management means for managing to what photo group the photo images input by the input means belongs; display control means for causing, with reference to information obtained by the management means, photo images belonging to a specified photo group to be displayed on the screen; and editing means for editing an electronic photo album using photo images displayed on the screen.

According to the present invention, an electronic photo album can be edited using photo images supplied from the image reading means, such as an image reader.

The above objects of the present invention are achieved by an electronic photo album editing apparatus formed in a computer system in which photo images and decorative components are set on a mount displayed on a screen of a display unit so that an electronic photo album is edited, the electronic photo album editing apparatus comprising: detecting means for detecting whether a request for enlarging/reducing an object set on the mount has been issued; determining means for determining whether the object to be enlarged/reduced is a photo image or a decorative component, when said detecting means detects the request for enlarging/reducing the object; and enlarging/reducing means for, when the determining means determines that the object to be enlarged/reduced is a photo image, enlarging/reducing the photo image without changing a ratio of length to width, and for, when the determining means determines that the object to be enlarged/reduced is a decorative component, enlarging/reducing the decorative component in accordance with a specified enlarging/reducing operation.

According to the present invention, since photo images are enlarged/reduced without changing the ratio of length to width, the photo images can be enlarged/reduced with no distortion. In addition, decorative components set on the mount can be enlarged/reduced in compliance with user's wishes.

The above objects of the present invention are achieved by an electronic photo album editing apparatus formed in a computer system in which photo images and a photo frame component for a photo image are set on a mount displayed on a screen of a display unit so that an electronic photo album is edited, the electronic photo album editing apparatus comprising: detecting means for detecting whether a photo image should be placed on the photo frame component set on the mount; setting means for setting an owner-member relationship between the photo frame component and the photo image placed on the photo frame component; first determining means for, when a request for moving/rotating the photo frame component is issued, determining whether there is an owner-member relationship between the photo frame component and a photo image; and moving/rotating means for, when the first determining means determines that there is the owner-member relationship between the photo frame component and a photo image, moving/rotating the photo frame component along with the photo image.

According to the present invention, a photo image placed on a photo frame component can be always moved/rotated together with each other.

The above objects of the present invention are achieved by an electronic photo album editing apparatus formed in a computer system in which photo images and decorative components are set on a mount displayed on a screen of a display unit so that an electronic photo album is edited, the electronic photo album editing apparatus comprising: detecting means for detecting a trace of movement of a mark which can be moved on the screen by an operation unit; storage means for, when a pen input mode is issued, storing data corresponding to the trace detected by the detecting means; deleting means for, when a pen deleting mode is issued, deleting data corresponding the trace detected by the detecting means from the storage means; and display control means for causing images corresponding to data stored in the storage means to be displayed on an uppermost layer of the screen.

According to the present invention, an electronic photo album can be edited using handwritten characters.

The above objects of the present invention are achieved by an electronic photo album editing apparatus formed in a computer system in which photo images are set on a mount displayed on a screen of a display unit so that an electronic photo album is edited, the electronic photo album editing apparatus comprising: management means for managing a trimming shape of a photo image using vector data; generating means for, when a trimming request is issued for a photo image, or when a request for enlarging/reducing a trimmed photo image is issued, generating a trimming shape having a specified size based on the vector data used in the management means; specifying means for, when a trimming request is issued for a photo image, specifying a part of the photo image included in the trimming shape generated by the generating means, and for, when the request for enlarging/reducing a trimmed photo image is issued, specifying a part of an enlarged/reduced image included in the trimming shape, the enlarged/reduced image being obtained by enlarging/reducing an original photo image of the trimmed photo image; and setting means for setting the part of the photo image specified by the specifying means on the mount.

According to the present invention, the indentation of the outline of the trimmed photo image can be prevented from being enlarged.

The above objects of the present invention are achieved by an electronic photo album editing apparatus formed in a computer system in which photo images and decorative components are set on a mount displayed on a screen of a display unit so that an electronic photo album is edited, the electronic photo album editing apparatus comprising: detecting means for detecting whether a deleting request is issued for an object set on the mount; display control means for, when the detecting means detects that the deleting request is issued for an object set on the mount, causing information to be displayed on the screen informing a user that the object will be deleted; deleting means for, when an executing instruction is issued, deleting the object from the screen.

According to the present invention, photo images and decorative components can be prevented from being deleted from the mount of the electronic photo album by mistake.

BRIEF DESCRIPTION OF THE DRAWINGS

Other objects, features and advantages of the present invention will be apparent from the following description when read in conjunction with the accompanying drawings, in which:

FIG. 7 is a diagram illustrating an example of a photo management file;

FIG. 8 is a diagram illustrating an example of a component management file;

FIG. 19 is a diagram illustrating an album editing screen;

FIG. 34 is a diagram illustrating a data directory;

FIG. 35 is a diagram illustrating an album management file;

FIG. 36 is a diagram illustrating album information;

DETAILED DESCRIPTION OF PREFERRED EMBODIMENTS

A description will be given of embodiments of the present invention.

Figure 1:
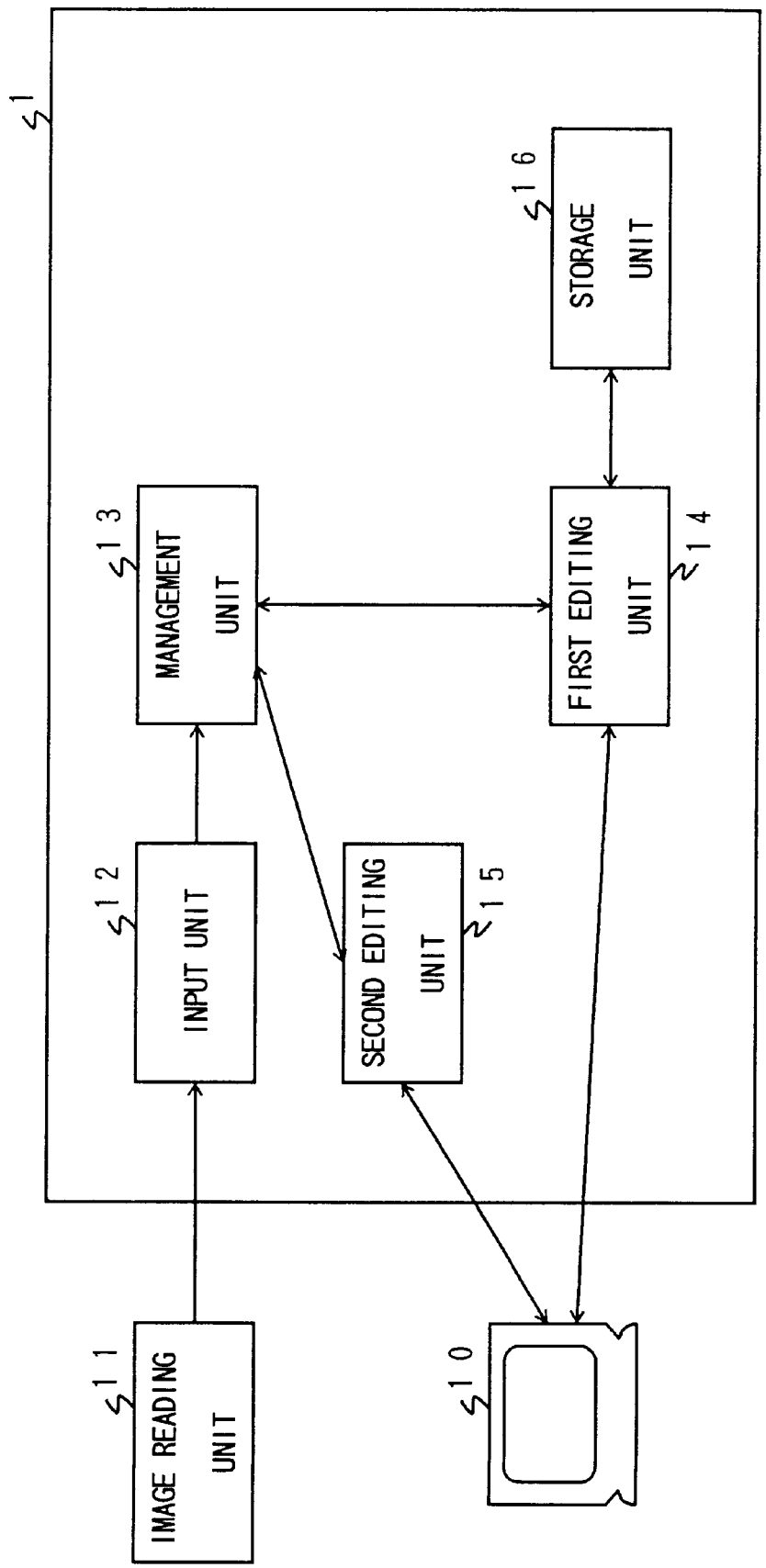
FIG. 1 is a block diagram illustrating a functional constitution of an electronic photo album editing apparatus according to an embodiment of the present invention.

An electronic photo album editing apparatus according to an embodiment of the present invention may have a functional arrangement as shown in FIG. 1. In the electronic photo album editing apparatus formed in a computer system, photo images, decorative components, photo frame components and characters are set on a mount displayed on a display screen so that the electronic photo album is edited. Referring to FIG. 1, an electronic photo album apparatus has a processing unit 1, a display unit 10 and an image reading unit 11. The display unit 10 is used for an input/output process in editing of the electronic photo album. The image reading unit 11 reads photographs and outputs reading signals corresponding to the photo images of the photographs.

The processing unit 1 is formed by a general computer system. The processing unit 1 has an input unit 12, a management unit 13, a first editing unit 14, a second editing unit 15 and a storage unit 16. The input unit 12 receives the reading signals from the image reading unit 11 and outputs photo data corresponding to the reading signals. The photo data is classified into groups each having a photo group name. The input unit 12 may be provided with video data and photo data supplied from other external units and recording mediums.

The management unit 13 manages what group the photo data generated by the input unit 12 belongs to. The first editing unit 14 controls the display unit 10 so that photo images corresponding to the photo data belonging to a specified group are displayed on a screen of the display unit 10. The first editing unit 14 identifies photo data corresponding to the photo images to be inserted in an electronic photo album by using pointer information. The electronic photo album is edited using the photo images displayed on the screen of the displayed unit 10 in an interactive processing. The first editing unit 14 can cause photo images to be displayed on the screen of the display unit 10 under a condition in which users can determine whether the displayed photo images have been already inserted in the electronic photo album. Further, photo images which have not yet been inserted in the electronic photo album can be preferentially displayed.

The second editing unit 15 controls the display unit 10 so that the list of photo group names set by the user and photo images belonging to a specified group are displayed. Further, the second editing unit 15 performs processes corresponding to editing requests to delete and move the photo images. The second editing unit 15 can cause the photo images belonging to the specified group to be displayed under a condition in which the users can determined whether the displayed photo images have been already inserted in the electronic album. When the request to delete photo images which have been already inserted in the electronic photo album is provided, the second editing unit 15 can cause a message indicating that the photo images to be deleted have been already inserted in the electronic photo album to be displayed on the screen.

The storage unit 16 stores information regarding the electronic photo album edited by the first editing unit 14.

In the electronic photo album editing apparatus as described above, when the input unit 12 generates photo data, based on reading signals from the image reading unit 11, video data and data supplied from the recording medium, and sets a photo group name to which the photo data belongs, the management unit 13 starts management of the photo data. The second editing unit 15 performs editing processes for deleting photo data managed by the management unit 13 and for transferring photo data from a group to another group.

The first editing unit 14 receives from the management unit 13 photo data belonging to a specified group, and causes photo images corresponding to the received photo data to be displayed on the screen of the display unit 10. In the first editing unit 14, the photo data is identified by the pointer information. In the interactive process, the first editing unit 14 edits the electronic photo album using the photo images corresponding to the photo data.

According to the electronic photo album editing apparatus as shown in FIG. 1, the electronic photo album can be edited using the photo data, based on the reading signals from the image reading unit 11, video data supplied from external units and data supplied from the recording medium (e.g., the photo-CD).

Figure 2:
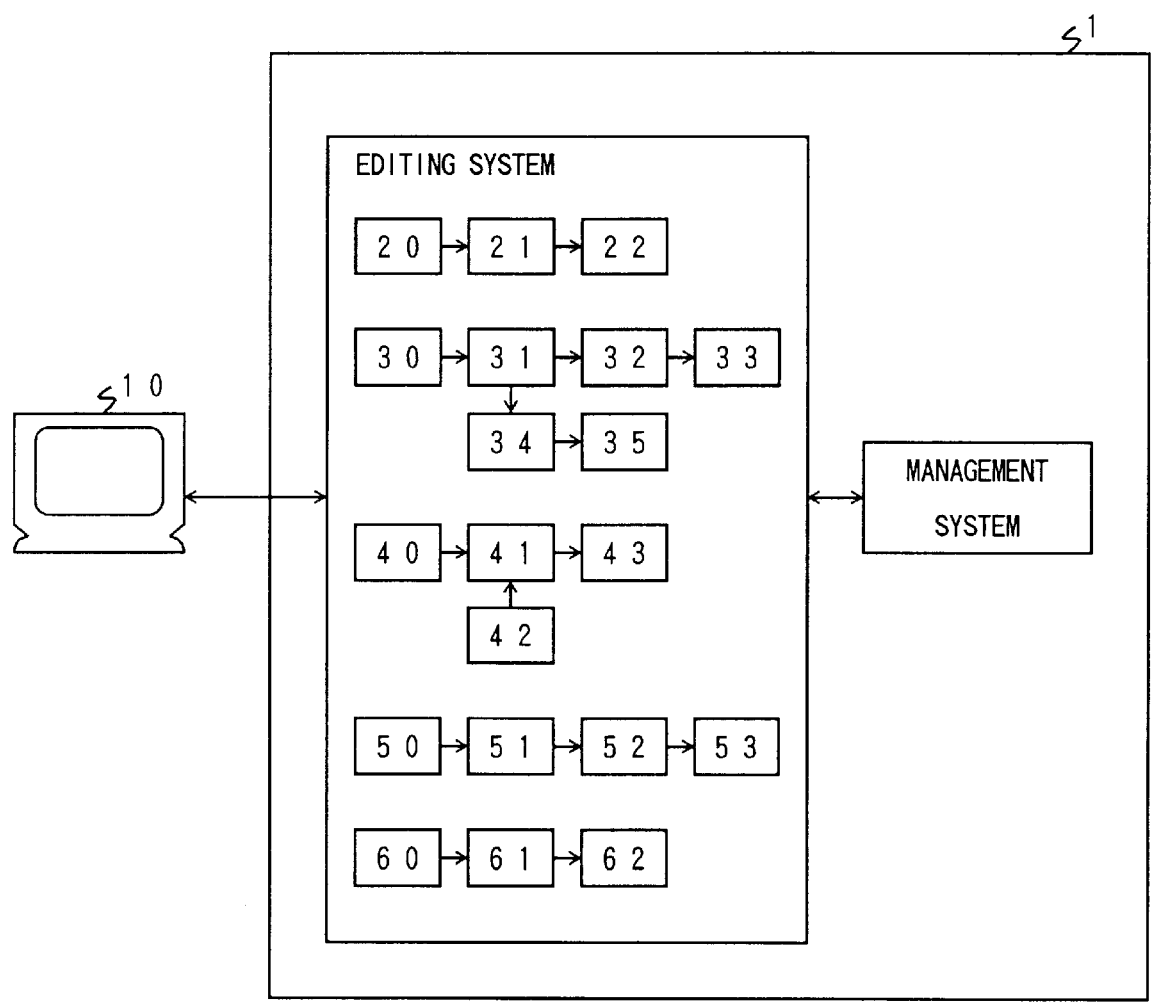
FIG. 2 is a block diagram illustrating a detailed functional constitution of the electronic photo album editing apparatus according to the embodiment of the present invention.

The processing unit 1 of the electronic photo album editing unit may be formed as shown in FIG. 2.

Referring to FIG. 2, the processing unit 1 has an editing system and a management system. The editing system executes the editing process and the management system executes the management process for information needed in the editing process. The editing system has a detection unit 20, a determining unit 21 and an enlarging/reducing unit 22. The detecting unit 20 detects whether there is an enlarging/reducing request issued for an object set on a mount of an electronic photo album. The determining unit 21 determines what type of object is set on the mount of the electronic photo album. The enlarging/reducing unit 22 executes processes for enlarging and reducing the object set on the mount of the electronic photo album.

The editing system has a detecting unit 30, a setting unit 31, a first determining unit 32, a moving/rotating unit 33, a second determining unit 34 and a limiting unit 35. The detecting unit 30 detects whether a photo image is set on a photo frame component which has been set on the mount of the electronic photo album. The setting unit 31 sets a relationship, between the photo frame component and the photo image set thereon, that the photo image is a member of the photo frame component. This relationship is referred to as an owner-member relationship. The first determining unit 32 determines whether there is a photo image with the owner-member relationship between a photo frame component the photo image. The moving/rotating unit 33 performs a process for moving and/or rotating the photo frame component and the photo image set thereon together with each other. The second determining unit 34 determines whether there is a photo image with the owner-member relationship between a photo frame component set on the mount and the photo image, and whether there is a photo frame component with the owner-member relationship between a photo image and the photo frame component. The control unit 35 limits a size of enlarged photo images and a size of reduced photo frame components.

The editing system has a detecting unit 40, a storage unit 41, a deleting unit 42 and a display control unit 43. The detecting unit 40 detects traces of a pointing mark (e.g., a cursor) moved on the screen of the display unit 10 by a pointing device (e.g., a mouse). The storage unit 41 stores data representing the traces detected by the detecting unit 40. The deleting unit 42 deletes the data stored in the storage unit 41. The display control unit 43 causes a tracing image represented by the data stored in the storage unit to be displayed on the screen of the display unit 10.

The editing system has a management unit 50, a generating unit 51, a specifying unit 52 and a setting unit 53. The management unit 50 manages a trimming outline of a photo image as vector data. The generating unit 51 generates data of a trimming outline of a photo image from the vector data. The specifying unit 52 specifies a photo image surrounded by the trimming outline. The setting unit 53 performs a process for setting the specified photo image on a mount of the electronic photo album.

The editing system has a detecting unit 60, a display control unit 61 and a deleting unit. The detecting unit 60 detects whether a request for deleting an object set on the mount has been issued. The display control unit 61 causes a message indicating that an object will be deleted to be displayed on the display unit 10. The deleting unit 63 performs a process for deleting an object set on the mount shown on the screen of the display unit 10.

The electronic album editing apparatus having the processing unit 1 as described above (see FIG. 2) operates as follows.

When the detecting unit 20 detects that an enlarging/reducing request is issued for an object set on the mount, the determining unit 21 determines whether the object of the enlarging/reducing request is a photo image or a figure component. When the determining unit 21 determines that the object of the enlarging/reducing request is a photo image, the enlarging/reducing unit 22 enlarges and reduces the photo image without changing the ratio of length to width. When the determining unit 21 determines that the object of the enlarging/reducing request is a figure component, the enlarging/reducing unit 22 enlarges and reduces the figure component in accordance with a specified enlarging/reducing operation.

As a result, the photo images can be enlarged and reduced without changing the ratio of length to width. The figure components can be enlarged and reduced in compliance with user's wishes.

In addition, when the detecting unit 30 detects that a photo image is set on a photo frame component, the setting unit 31 sets the owner-member relationship between the photo image and the photo frame component. When a moving/rotating request is issued for the photo frame component set on the mount, the first determining unit 32 determines whether there is a photo image with the owner-member relationship between the photo frame component and the photo image. When the first determining unit 32 determines that there is a photo image with owner-member relationship between the photo frame component and the photo image, the moving/rotating unit 33 moves and rotates the photo frame component and the photo image together with each other.

When an enlarging request is issued for a photo image set on the mount, the second determining unit 34 determines whether there is a photo frame component with the owner-member relationship between the photo image and the photo frame component. When the second determining unit 34 determines that there is a photo frame component with the owner-member relationship between the photo image and the photo frame, the limiting unit 35 limits the size of the enlarged photo image so that the size of the enlarged photo image does not exceed the size of the photo frame component. When a reducing request is issued for a photo frame component, the second determining unit 34 determines whether there is a photo image with the owner-member relationship between the photo frame component and the photo image. When the second determining unit 34 determines that there is a photo image with the owner-member relationship between the photo frame component and photo image, the limiting unit 35 limits the size of the reduced photo frame component so that the size of the photo image does not exceed the size of the reduced photo frame component.

As a result, the photo image set on the photo frame component can be moved and rotated together with the photo frame component. Further, the photo image set on a photo frame component can be automatically enlarged and the photo frame component on which a photo image is set can be automatically reduced.

When a pen-input mode is issued, the detecting unit 40 detects traces of the pointing mark moved on the screen of the display unit 10 by the pointing device. The data representing the traces detected by the detecting unit 40 is then stored in the storage unit 41 separately from data of other objects set on the mount. When a pen-deleting mode is issued, the deleting unit 42 deletes data from the storage unit 41 corresponding to traces of the pointing mark on the screen of the display unit 10 detected by the detecting unit 40. The display control unit 43 causes images corresponding to the data stored in the storage unit 41 to be displayed on the uppermost layer of the screen of the display unit 10.

Thus, handwritten characters and handwritten images can be inserted in and deleted from the electronic photo album.

When a trimming request for a photo image is issued or when an enlarging/reducing request for a trimming-modified photo image is issued, the generating unit 51 generates, from vector data managed by the management unit 50, an outline of the photo image having a size specified in the request. When a trimming request for a photo image is issued, the specifying unit 52 specifies a photo image surrounded by the outline generated by the generating unit 51. When an enlarging/reducing request for a trimming-modified photo image is issued, after an original image of the trimming-modified photo image is enlarged/reduced, the specifying unit 52 specifies, in the enlarged/reduced photo image, a photo image surrounded by the outline generated by the generating unit 51. The specified photo image is set, by the setting unit 53, on the mount of the electronic photo album displayed on the screen of the display unit 10.

Thus, the trimming-modified photo image can be enlarged without indentation of the outline of the enlarged photo image.

When the detecting unit 60 detects that a deleting request for an object set on the mount of the electronic photo album has been issued, the display control unit 61 causes a mark indicating a deleting instruction for the object to be displayed on the screen of the display unit 10. After this, a message indicating that the object will be deleted is displayed on the screen of the display unit 10. In this state, when a deleting request is issued, the object is deleted from the mount of the electronic photo album. On the other hand, if the deleting request is not issued, the object is not deleted.

Thus, photo images and decorative components can be prevent from being deleted by mistake from the mount of the electronic photo album.

A description will now be given of an embodiment of the present invention.

The electronic photo album editing apparatus is formed in a computer system. Photo images, decorative components, photo frame components and characters are set on a mount displayed on the screen of the display unit 10 so that the electronic photo album is edited.

Figure 3A:
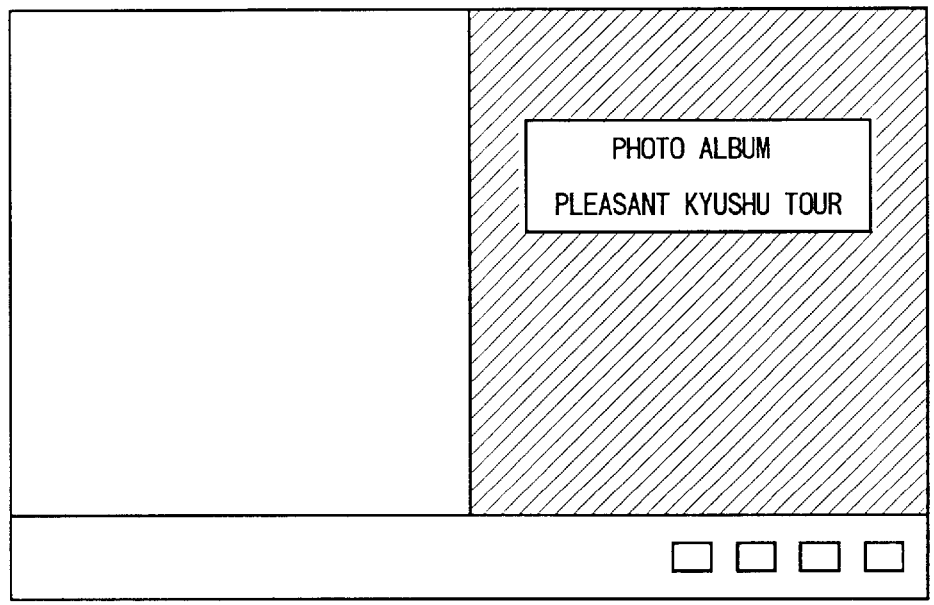
FIGS. 3A and 3B are diagrams illustrating pages of an electronic photo album.
Figure 3B:
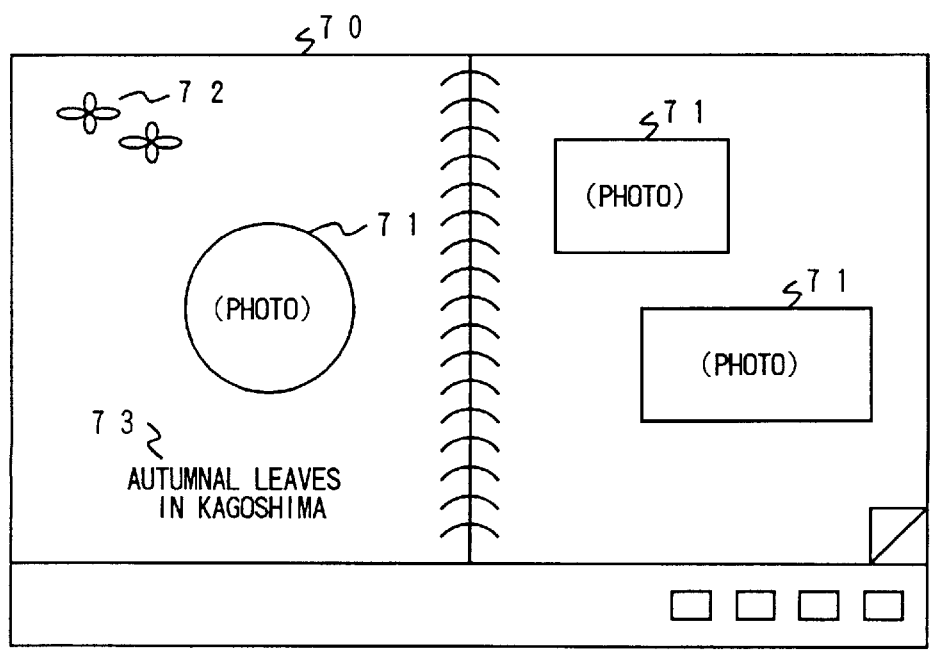

In the electronic photo album editing apparatus, for example, as shown in FIG. 3A, a cover tilted "PLEASANT KYUSHU TOUR" is made. In addition, as shown in FIG. 3B, an photo image 71 is set on a mount 70. The photo image 71 may be enlarged, reduced and modified by trimming. Figure components 72 (e.g., autumnal leaves) and characters 73 (e.g., AUTUMNAL LEAVES IN KAGOSHIMA) may be set on the mount 70 in the same manner as the photo images 71.

Figure 4:
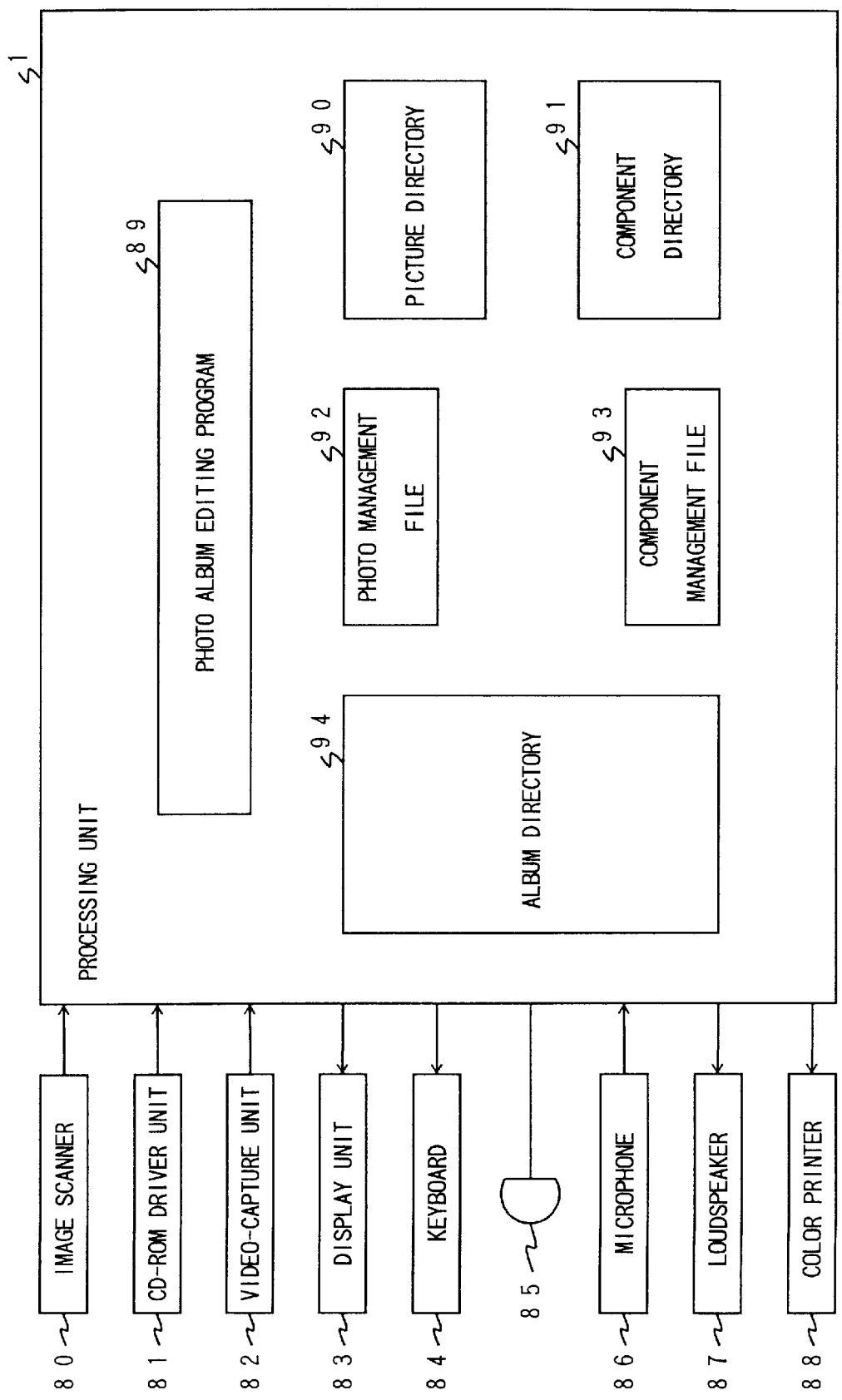
FIG. 4 is a block diagram illustrating an electronic photo album editing apparatus according to an embodiment of the present invention.

The electronic photo album editing apparatus is formed as shown in FIG. 4.

Referring to FIG. 4, the electronic photo album editing apparatus has the processing unit 1, an image scanner 80, a CD-ROM driver unit 81, a video-capture unit 82, a display unit 83, a keyboard 84, a mouse 85, a microphone 86, a loudspeaker 87 and a color printer 88. The image scanner 80 optically reads photo images on photographs. The CD-ROM driver unit 81 reads photo data stored in a photo-CD set therein. The video-capture unit 82 receives video data from a video terminal. The display unit 83 is used in input/output processes. The keyboard 84 is used to input information to the processing unit 1. The mouse 85 is used in a pointing operation for inputting information to the processing unit 1. The microphone 86 is used to input sound data to the processing unit 1. The loudspeaker 87 outputs sounds. The color printer 88 prints a photo album based on print data, corresponding to the edited electronic photo album, from the processing unit 1.

The processing unit 1 is provided with a photo album editing program 89, a picture directory 90, a component directory 91, a photo management file 92, a component management file 93 and an album directory 94. The photo album editing program 89 executes an editing process for an electronic photo album. Photo data corresponding to photo images which are objects used to edit the electronic photo album are stored in the picture directory 90. Data corresponding to components which are objects used to edit the electronic photo album is stored in the component directory 91. The photo management file 92 manages the photo data stored in the picture directory 90. The component management file 93 manages data of the components stored in the component directory 91. The album directory 94 manages information of an edited electronic photo album.

Figure 5:
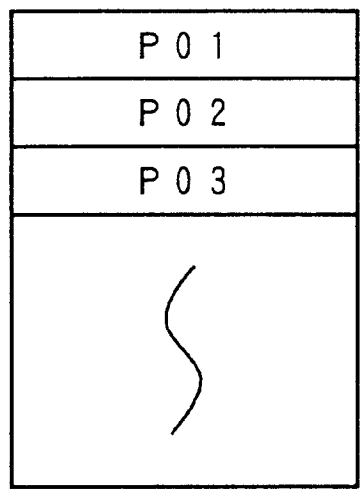
FIG. 5 is a diagram illustrating an example of a picture directory.

Photo data supplied from the image scanner 80, photo data read out from the photo-CD set in the CD-ROM driver unit 81 and video data supplied from the video capture unit 82 are managed in the picture directory 90. Pointers indicating the photo data and the video data are continuously stored in the picture directory 90 as shown in FIG. 5.

Figure 6:
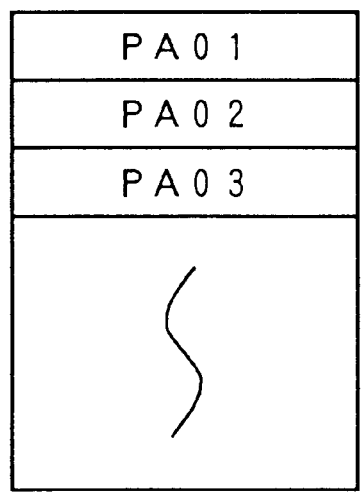
FIG. 6 is a diagram illustrating an example of a component directory.

Figure data corresponding to components, prepared in this system, such as mounts, various components indicating seasons etc. and photo frames are managed in the component directory 91. Pointers indicating the figure data are continuously stored in the component directory 91 as shown in FIG. 6.

The picture management unit 92 manages, as shown in FIG. 7, what photo data is stored in the picture directory 90, what photo-box the photo data belongs to and whether the photo data is used for the electronic photo album. The photo data is managed using the concept of the photo-box as will be described later.

The component management unit 93 manages, as shown in FIG. 8, what components are stored in the component directory 91, what type the components belong to and what component-box the figure data corresponding to components belongs to. The figure data corresponding to the components is managed using the concept of the component-box as will be described later. Component-boxes for the mount, the photo frame and the seasonable components are prepared in the system. In each component-box, design of a plurality of components belonging thereto is recorded.

Figure 9:
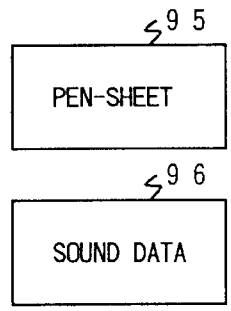
FIG. 9 is a diagram illustrating an example of an album directory.

The album directory 94 is provided, as shown in FIG. 9, with pointer information and other information for each page of the electronic photo album. That is, pointer information to photo data set in each page, pointer information to figure data of a mount used in each page, pointer information to figure data of components set in each page, character information of characters input by the keyboard 84 for each page, trimming information for photo data used in each page, pointer information to a pen-sheet 95 used to manage figure data of handwritten characters input to each page and pointer information to sound data 96 used to manage the sound data input for each page are managed in the album directory 94.

Figure 10:
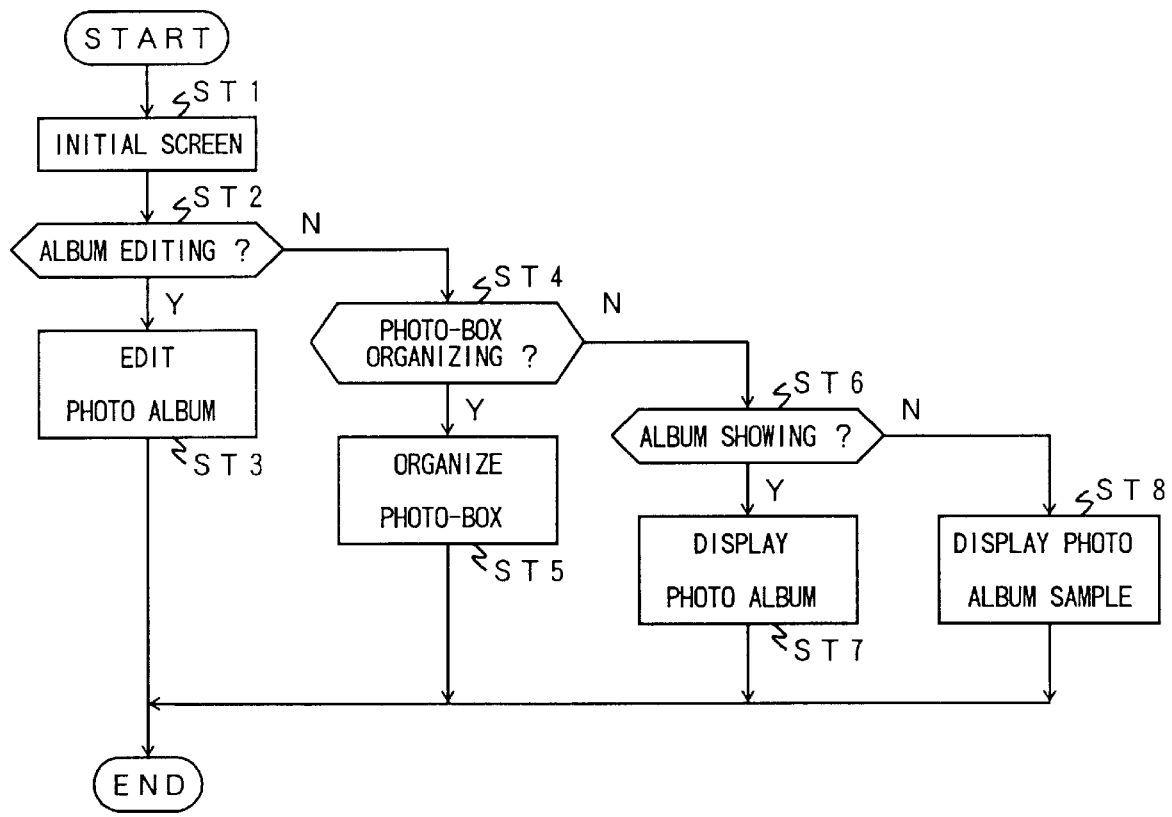
FIG. 10 is a flowchart illustrating a process executed by an album editing program.

The album editing program 89 executes the editing process as shown in FIG. 10.

Figure 11:
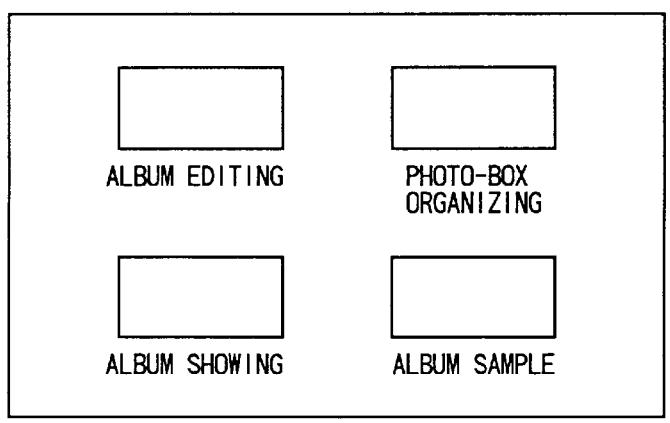
FIG. 11 is a diagram illustrating an initial screen.

Referring to FIG. 10, first, an initial screen is displayed on the display unit 83 (ST1). The initial screen is provided, as shown in FIG. 11, with icons for an album editing process, a photo-box organizing process, an album-show process and an album sample.

When a user clicks, using the mouse 85, one of the icons on the initial screen of the display unit 83, it is determined what icon is clicked (ST2, ST4 and ST6). If it is determined that the icon for the album editing process is clicked (ST2), the album editing process is executed. If it is determined that the icon for the photo-box organizing process is clicked (ST2 and ST4), the process for organizing photo data belonging to a specified photo-box is executed (ST5). If it is determined that the icon for the album-show process is clicked (ST2, ST4 and ST6), the process for showing a specified album is executed (ST7). If it is determined that the icon for the album sample is clicked (ST2, ST4 and ST6), the process for showing a sample of the album (ST8) is executed.

Figure 12:
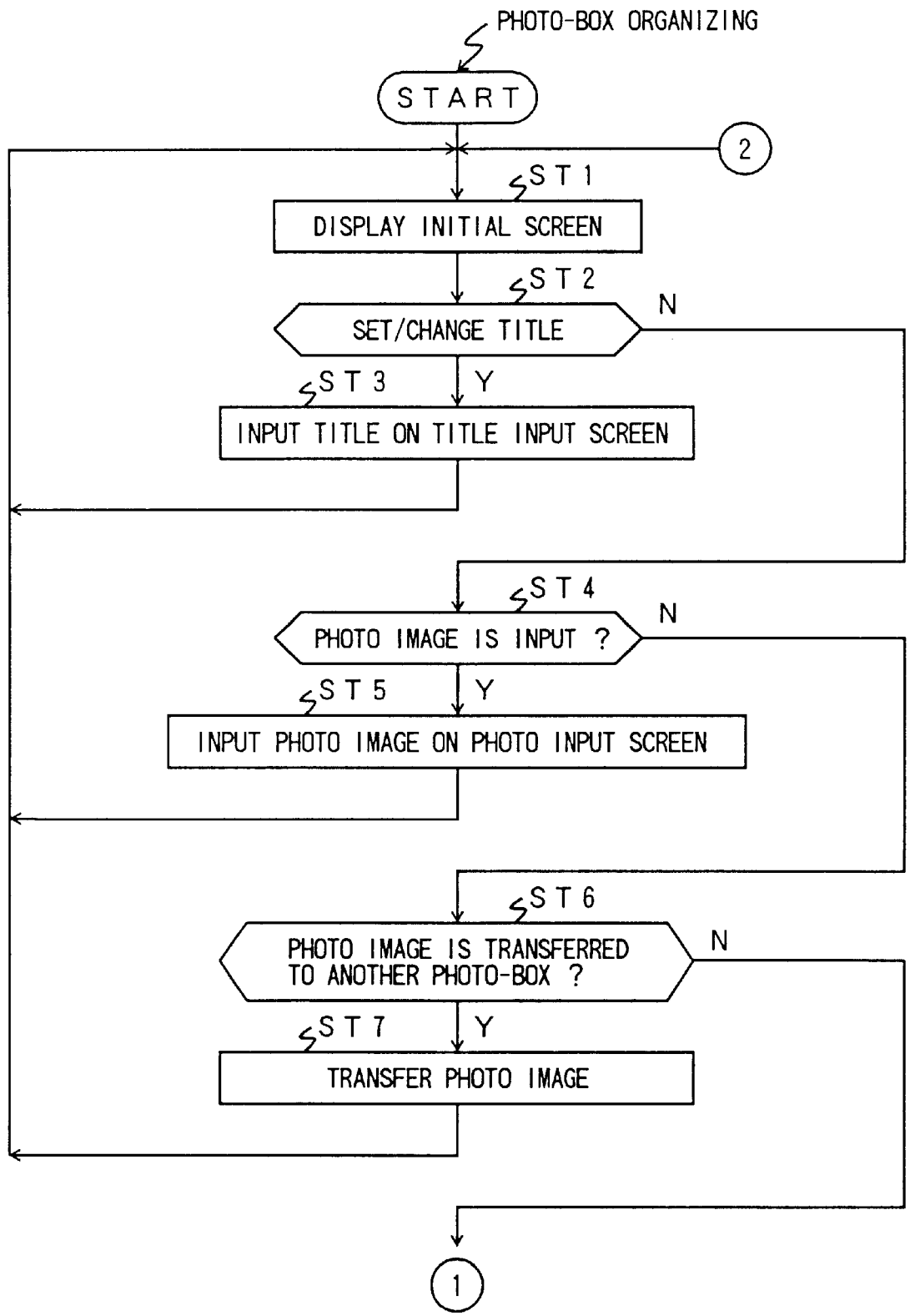
FIG. 12 is a flowchart illustrating a process executed by the album editing program.
Figure 13:
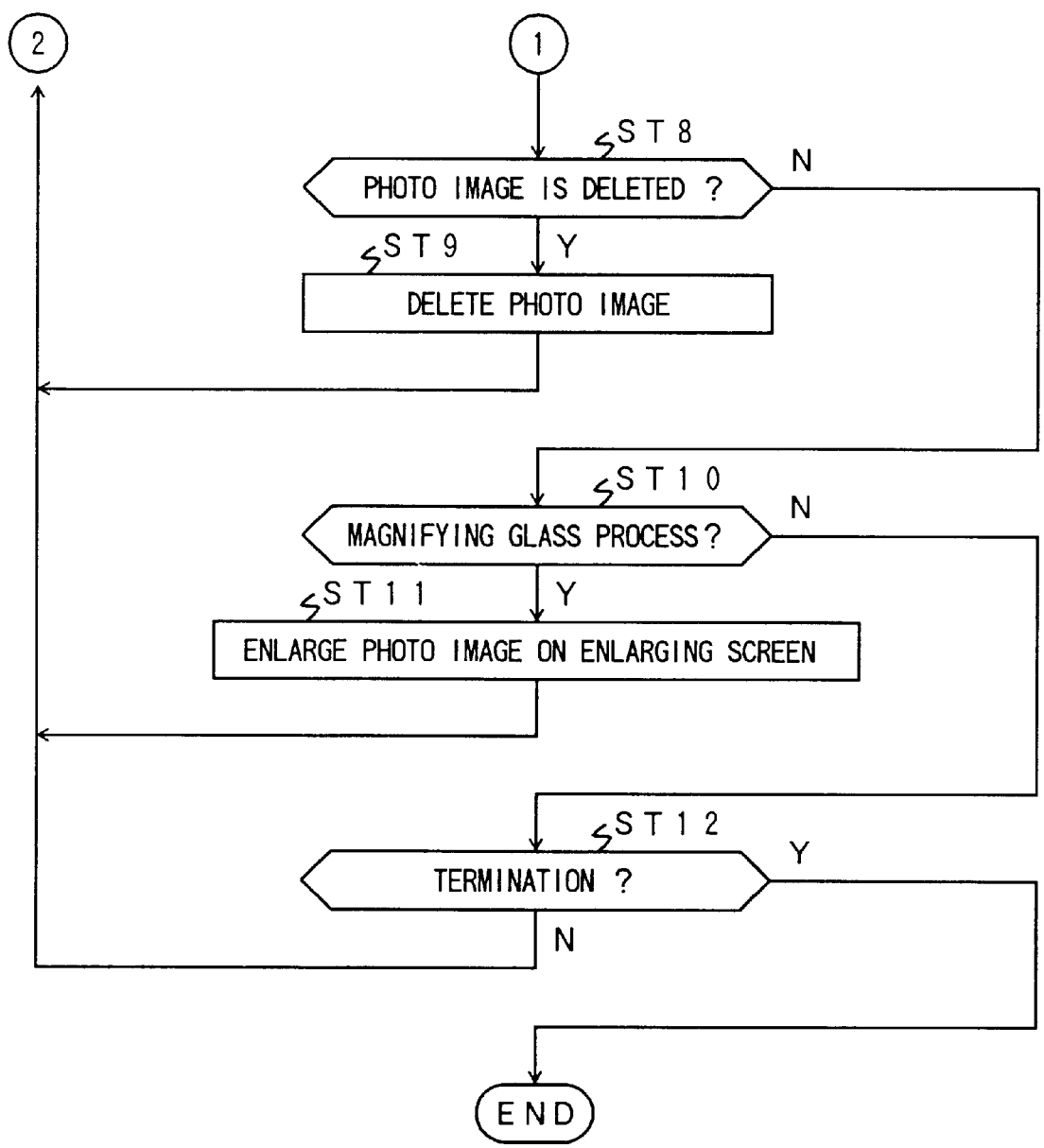
FIG. 13 is a flowchart illustrating a process executed by the album editing program.

The album editing program 89 executes the process for organizing photo data belonging to a specified photo-box (the photo-box organizing process) in accordance with a procedure as shown in FIGS. 12 and 13.

Figure 14:
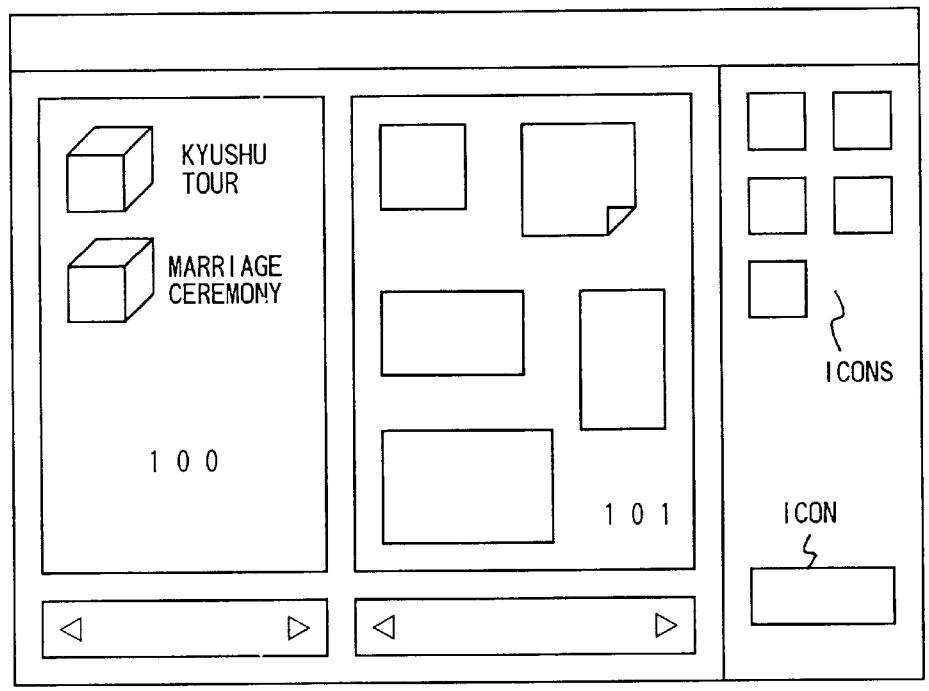
FIG. 14 is a diagram illustrating an initial screen for a process for organizing a photo-box.

Referring to FIG. 12, an initial screen for the photo-box organizing process is displayed on the display unit 83 (ST1). The initial screen is provided, as shown in FIG. 14, with a photo-box list area 100, a photo area 101 and various icons. In the photo-box list area 100, a list of titles of photo-boxes which has been made is indicated. In the photo area 101, photo images belonging to a selected photo-box are reduced and listed. The reduced photo images which are listed in the photo area 101 are referred to as miniature photo images. The icons includes an icon for a title setting/changing process, an icon for a process for inputting photo images, an icon for a photo-box transferring process, an icon for a photo data deleting process, an icon for a magnifying glass process and an icon for a termination process.

Reduced photo images indicated in the photo area 101 are arranged in the order of input. A lower right corner portion of each of the photo images which have been inserted in the electronic album is folded. In a case where no photo-box is made, a photo-box titled "unused" is indicated in the photo-box list area 100. When a photo-box is selected, the photo-box having an open lid is indicated.

In a state where the initial screen is being displayed on the display unit 83, it is determined, in step ST2, whether the icon for the title setting/changing process and a photo-box whose title should be set or changed has been clicked. When it is determined that the icon for the title setting/changing process has been clicked, a title input screen is opened on the display unit 83 (ST3). When a user inputs a title, such as "KYUSHU TOUR" using the keyboard 84, the title is set for the clicked photo-box. After this, the process returns to step ST1.

On the other hand, when it is determined, in step ST2, that the icon for the title setting/changing process has not been clicked, it is further determined, in step S4, whether the icon for the process for inputting photo images and a photo-box to which the input photo images should belong have been clicked. When the icon of the process for the input photo images has been clicked, a photo input screen used to input photo images into the clicked (selected) photo-box is opened on the display unit 83 (ST5). The input photo images are put into the selected photo-box. That is, the relationship between photo data corresponding to the input photo image and the selected photo-box is entered in the photo management file 92. After this, the process returns to step ST1.

Figure 15:
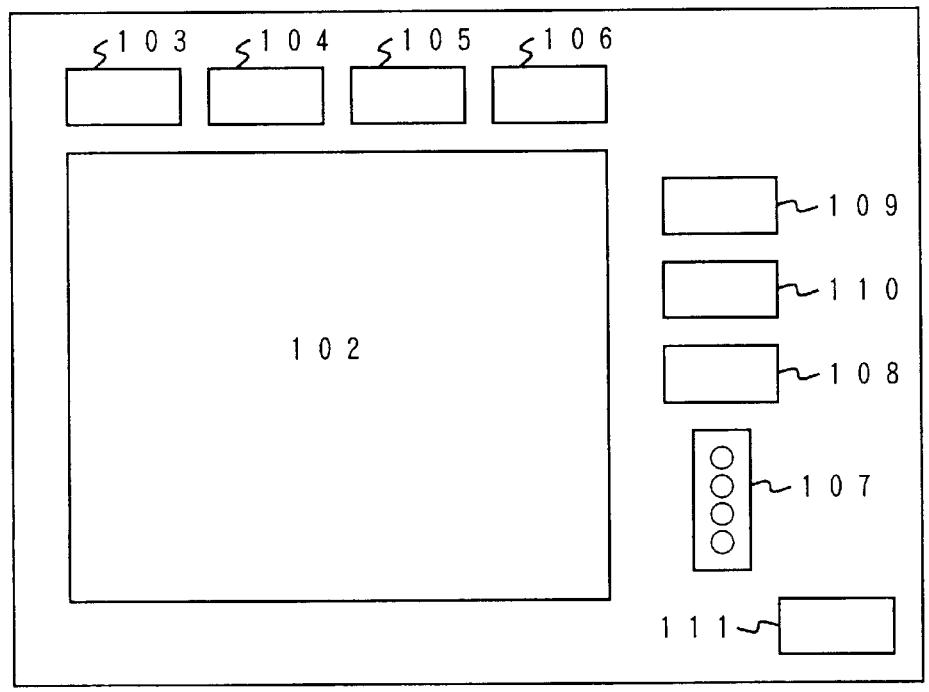
FIG. 15 is a diagram illustrating a screen for a process for taking photo images.

The photo input screen described above is provided, as shown in FIG. 15, with a display area 102 and icons 103 through 111. The input photo images are displayed in the display area 102 of the photo input screen. The icon 103 is used to input images from the image scanner 80. The icon 104 is used to input images from the CD-ROM driver unit 81. The icon 105 is used to input images from the video capture unit 82. The icon 106 is used to input images from files. The icon 107 are used to invert and rotate the input photo images. The icon 108 is used to clip a part from an input photo image. The icon 109 is used to instruct input photo images. The icon 110 is used to enter input photo images in a photo-box. The icon 111 is used for the termination of the process.

Returning to FIG. 12, on the other hand, when it is determined, in step ST4, that the icon for the process for inputting photo images is not operated, it is further determined, in step ST6, whether the icon, the photo images and a photo-box have been clicked. The clicked icon is for the process for transferring photo image from one photo-box to another (the photo-box transferring process). The clicked photo images are photo images to be transferred. The clicked photo-box is a photo-box to which the clicked photo images should be transferred. When the icon, the photo images and the photo-box have been clicked, specified photo images are transferred to the specified photo-box in step ST7. That is, the relationship, entered in the photo management file 89, between photo data corresponding to the photo images and the photo-box is updated.

On the other hand, when it is determined, in step ST6, that the icon for the process for transferring photo images to another photo-box has not been clicked, it is determined, in step ST8 shown in FIG. 13, whether the icon for the process for deleting photo images and a photo image which should be deleted have been clicked. When it is determined that the icon and the photo image have been clicked, the specified photo image is deleted (ST9) and the process returns to step S1 shown in FIG. 12. When a photo-box is clicked in a state where the icon for the process for deleting photo images has been clicked, all the photo images belonging to the specified photo-box are deleted. If a photo image which has been clicked to be deleted is used in the electronic photo album, a message asking whether the photo image may be deleted is displayed on the screen of the display unit 83.

On the other hand, when it is determined, in step ST8, that the icon for the process for deleting photo images has not been clicked, it is determined, in step ST10, whether the icon for the magnifying glass process and a photo image to be enlarged have been clicked. When it is determined that the icon and the photo image have been clicked, a enlarging screen is opened and the specified photo image is enlarged and the enlarged photo image is displayed on the enlarging screen, in step ST11. After this, the process returns to step ST1 shown in FIG. 12.

On the other hand, when it is determined that the icon for the magnifying glass process has not been clicked, it is determined, in step ST12, whether the icon for the termination process has been clicked. If it is determined that the icon for the termination process has not been clicked, the process returns to step ST1 shown in FIG. 12. If it is determined that the icon for the termination has been clicked, the photo-box organizing process is terminated.

As has been described above, according to the photo-box organizing process executed by the album editing program 89, photo data supplied from the image scanner 80, photo data supplied from the CD-ROM driver unit 81 and video data supplied from the video capture unit 82 can be stored in the specified photo-box, photo images (video images) belonging to the specified photo-box can be deleted and the photo images can be transferred from one photo-box to another photo-box.

Figure 16:
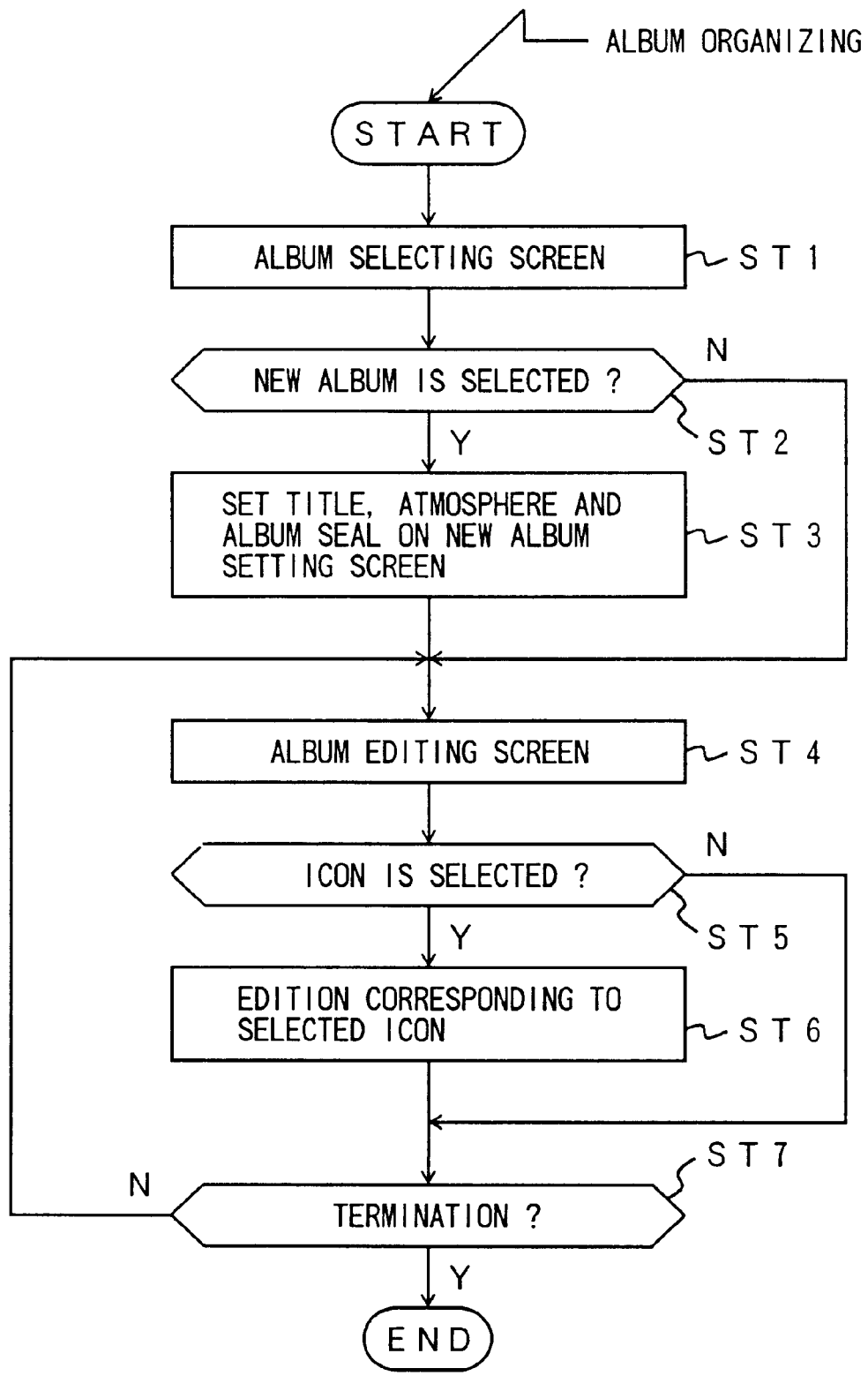
FIG. 16 is a flowchart illustrating a process executed by the album editing program.

Next, when the icon for the album editing process on the initial screen shown in FIG. 11 is clicked, the album editing program 89 executes the album editing process in accordance with a procedure as shown in FIG. 16. Referring to FIG. 16, first, an album selecting screen is opened in the display unit 83 (ST1). The album selecting screen is provided with a list of titles of electronic photo albums which have been made and an indication of an instruction to make a new electronic photo album. The album selecting screen is further provided with an icon used to instruct printing of a selected electronic photo album and an icon used to instruct deleting a selected electronic photo album.

Figure 17:
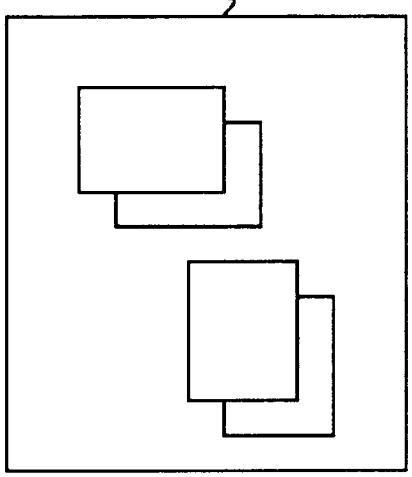
FIG. 17 is a diagram illustrating a screen for a process for setting a new album.

In a state where the album selecting screen is opened, it is determined, in step ST2, whether the indication of the instruction to make a new electronic photo album has been clicked (the new electronic photo album has been selected). When it is determined that the indication of the instruction to make a new electronic album has been clicked, a new album setting screen as shown in FIG. 17 is opened in the display unit 83, in step ST3. On the new album setting screen, the user can set a title of the new photo album, an atmosphere of the electronic photo album and an album seal.

The title of the new electronic photo album is input from the keyboard 84. The album seal is a figure component indicating an illustration of an event. The system has prepared album seals indicating, for example, a "tour", a "marriage ceremony" and the like.

The atmosphere of the electronic photo album is an atmosphere caused by patterns of mounts, characters, decorations and the like. The system has prepared five modes to select the atmosphere: a spring mode atmosphere, a summer mode atmosphere, an autumn mode atmosphere, a winter mode atmosphere and a desired mode atmosphere. If the spring mode atmosphere is selected, mounts having spring-like patterns are selected and it is decided that decorations of photo images and a character style, a size of characters all of which fit to the selected mounts should be used. Samples of the selected mount, decided characters and decorations are displayed on a sample display area 112. When the desired mode atmosphere is selected, the user can make a desired atmosphere. In the desired mode atmosphere, a white paper is displayed on the sample display area 112. The system also has a function of changing the atmosphere of all the mounts of the electronic photo album all together after the electronic photo album is completely edited.

After it is determined, in step ST2, that the indication of the instruction to make a new electronic photo album has not been clicked (an electronic photo album which has been made is selected), or after the title, the atmosphere and the album seal are decided in step ST3, an album editing screen is opened in step ST4.

It is then determined, in step ST5, whether an icon indicated on the album editing screen has been clicked. If an icon indicated on the album editing screen is clicked, a process specified by the clicked icon is executed, in step ST6. After the process is completed, it is determined, in step ST7, whether the termination of the album editing process is instructed by the user. If the termination of the album editing process is not instructed, the process returns to step ST4. On the other hand, if the termination of the album editing process is instructed, the album editing process is completed.

Figure 18:
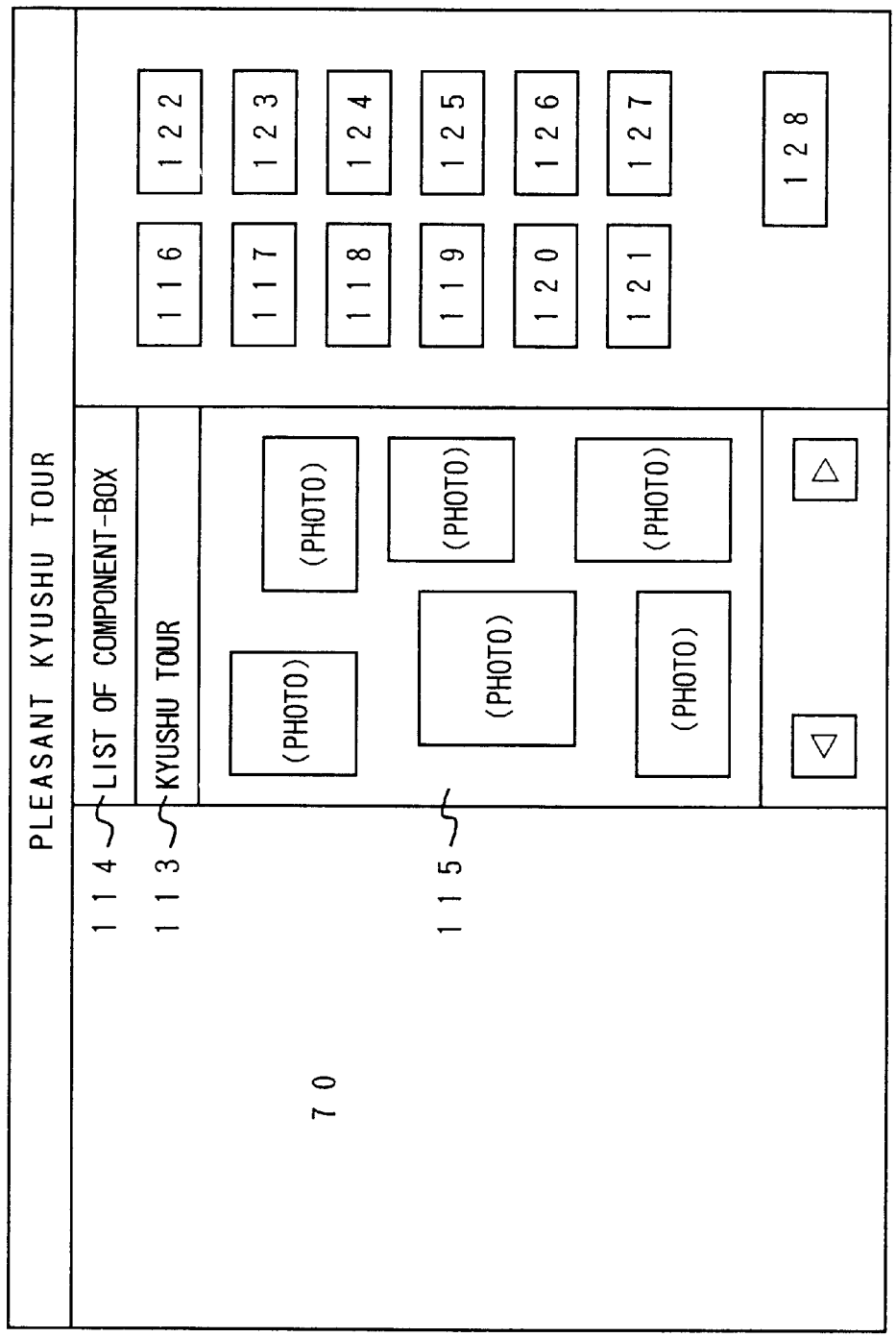
FIG. 18 is a diagram illustrating an album editing screen.

The album editing screen is formed as shown in FIG. 18.

Referring to FIG. 18, the album editing screen is provided with a mount 70, a photo-box list icon 113, a component-box list icon 114, a working area 115, a selecting icon 116, a character icon 117, a rotation icon 118, a recording icon 119, a page adding icon 120, an album-show icon 121, a decoration icon 122, a naughty pen icon 123, a magnifying glass icon 124, a print icon 125, a jump icon 126, a delete icon 127 and a termination icon 128.

The photo-box list icon 113 is used to show a list of titles of photo-boxes which have been made. When the photo-box list icon 113 is clicked, the list of titles of photo-boxes which have been made is shown in the working area 115. When a title of a photo-box including photo images which should be used to edit the electronic photo album is selected from the list of titles of photo-boxes, the photo images belonging to the selected photo-box are reduced (the miniature photo images are made) and a list of the miniature photo images is indicated in the working area 115, as shown in FIG. 18. In a case where miniature photo images corresponding to all the photo images belonging to the selected photo-box are not simultaneously indicated in the working area 115, the working area 115 is scrolled by an operation of a scroll bar, so that all the miniature photo images are shown to the user.

The component-box icon 114 is used to show a list of titles of component boxes storing system components which can be set on the mount 70. When the component-box icon 114 is clicked, the list of titles of component-boxes which have been prepared in the system is shown in the working area 115, as shown in FIG. 19. When a title of a component-box used to edit the electronic photo album is selected from the list of titles of component-boxes, figures of system components belonging to the selected component-box are reduced and a list of the miniature figures of the system components is indicated in the working area 115.

The system components prepared in the system include mounts 70, such as diary mounts and colored mounts, seasonable components, such as components of figures of autumnal leaves, photo frame components showing photo frames on which photo images are set, animal components showing figures of animals, such as dogs, and the like. When all the system components are not simultaneously indicated in the working area 115, the working area 115 is scrolled by an operation of the scroll bar, so that all the system components are shown to the user.

The selecting icon 116 is used to set photo images and system components on the mount 70 and to enlarge/reduce/move the photo images and system components set on the mount 70. The character icon 117 is used to set characters input from the keyboard 84 on the mount 70. The rotation icon 118 is used to rotate photo images and characters set on the mount 70. The recording icon 119 is used to set sound data supplied from the microphone 86 on the mount 70.

The page adding icon 120 is used to add a new page to the electronic photo album. The album show icon 121 is use to show the edited electronic photo album to the user. The decoration icon 122 is used to decorate the photo images and characters set on the mount 70. The naughty pen icon 123 is used to set, on the mount 70, handwritten characters and handwritten figures input by operations of mouse 85. The magnifying glass icon 124 is used to enlarge photo images indicated in the wording area 115 (to indicate photo images in an enlarged screen).

The print icon 125 is used to print the edited electronic photo album on a sheet. The jump icon 126 is used to jump pages of the electronic photo album. The delete icon 126 is used to delete photo images and system components from a page (the mount 70). The termination icon 127 is used to terminate the album editing process.

A description will now be given of the album editing process using the album editing screen shown in FIG. 19. When the selecting icon 116 on the album editing screen is clicked, the process is executed in accordance with a procedure shown in FIG. 20.

The system waits for photo images and system components to be clicked. When photo images and/or system components are clicked, the clicked photo images and/or system components are copied from the working area 115 and set at positions pointed to by the mouse 85 on the mount 70, in step ST1. The photo images and system components which should be set on the mount 70 are enlarged at predetermined sizes.

Figure 21:
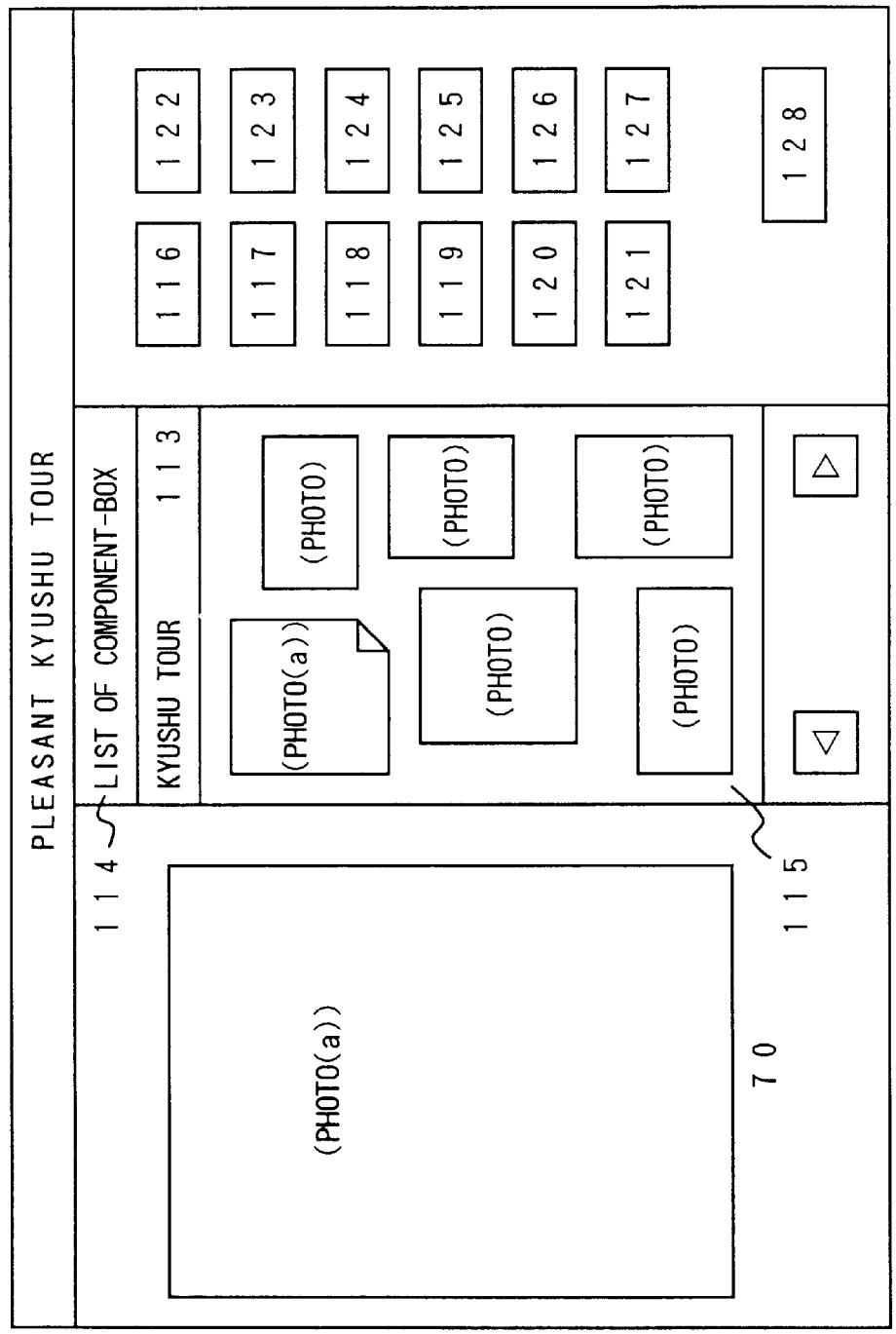
FIG. 21 is a diagram illustrating an album editing screen.

If decorative components for the mount 70 have been decided as the default condition, the decorative components are attached to the photo images set on the mount 70, in step ST2. When a photo image is set on the mount 70, the lower right corner of a miniature photo image, corresponding the photo image set on the mount 70, indicated in the working area 115 is folded as shown as a miniature photo image (a.) in FIG. 21, in step ST3. The folded lower right corner portion of a miniature photo image means that a photo image corresponding to the miniature photo image is being used in the electronic photo album. The miniature photo image having the folded lower right corner is transferred to a tail end of the arranged miniature photo images. At this time, information regarding the photo image corresponding to the miniature photo image which is transferred in the photo management file 92. When a photo image set on the mount 70 is deleted, the folded lower right corner of the corresponding miniature photo image is recovered. The miniature photo image in which the folded lower right corner is recovered is arranged at a head of the miniature photo images.

After this, it is determined, in step ST4, whether an enlarging/reducing request for photo images or a system components set on the mount 70 has been issued. When one of four corner portions of a photo image or a system component is clicked, the system recognizes that the enlarging/reducing request for the clicked photo image or system component is issued. When it is determined, in step ST4, that the enlarging/reducing request for a photo image or a system component has issued, it is further determined, in step ST5, whether the enlarging/reducing request has been issued for a photo image or a system component.

In a case where the enlarging/reducing request has been issued for a photo image, the photo image is enlarged/ reduced without changing the ratio of length to width, in accordance with an operation of the mouse 85, in step ST6. On the other hand, in a case where the enlarging/reducing request has been issued for a system component, the system component is enlarged/reduced in accordance with an operation of the mouse 85, in step ST7. In this case, when an operation for enlarging/reducing the system component is performed such that the ratio of length to width is changed, the system component is enlarged/reduced in accordance with the operation such that the ratio of length to width is changed.

That is, if a photo image is enlarged/reduced such that ratio of length to width is changed, the enlarged/reduced photo image is distorted. Thus, the photo image is enlarged/ reduced without changing the ratio of length to width. On the other hand, the system component is enlarged/reduced in accordance with the operation of the mouse 85 without the limitation on changes to the ratio of length to width.

If the process in step ST6 or ST7 is completed or if it is determined, in step ST4, that an enlarging/reducing request has not been issued, it is further determined, in step ST8, whether a moving request has been issued for a photo image or a system component. When the inside of a photo image or a system is clicked, the system recognizes that the moving request is issued for the photo image or the system component.

When it is determined, in step ST8, that a moving request has been issued for a photo image or a system component, the photo image or the system component is moved in accordance with an operation of the mouse 85, in step ST9. After the photo image or the system component is completely moved, it is determined, in step ST10, whether the termination request has been issued. When the termination request has not been issued, the process returns to step ST4. On the other hand, if the termination request is issued, the process is terminated. In addition, if it is determined, in step ST8, that the moving request has not been issued for any photo images or system components, the process returns to step ST4.

Figure 20:
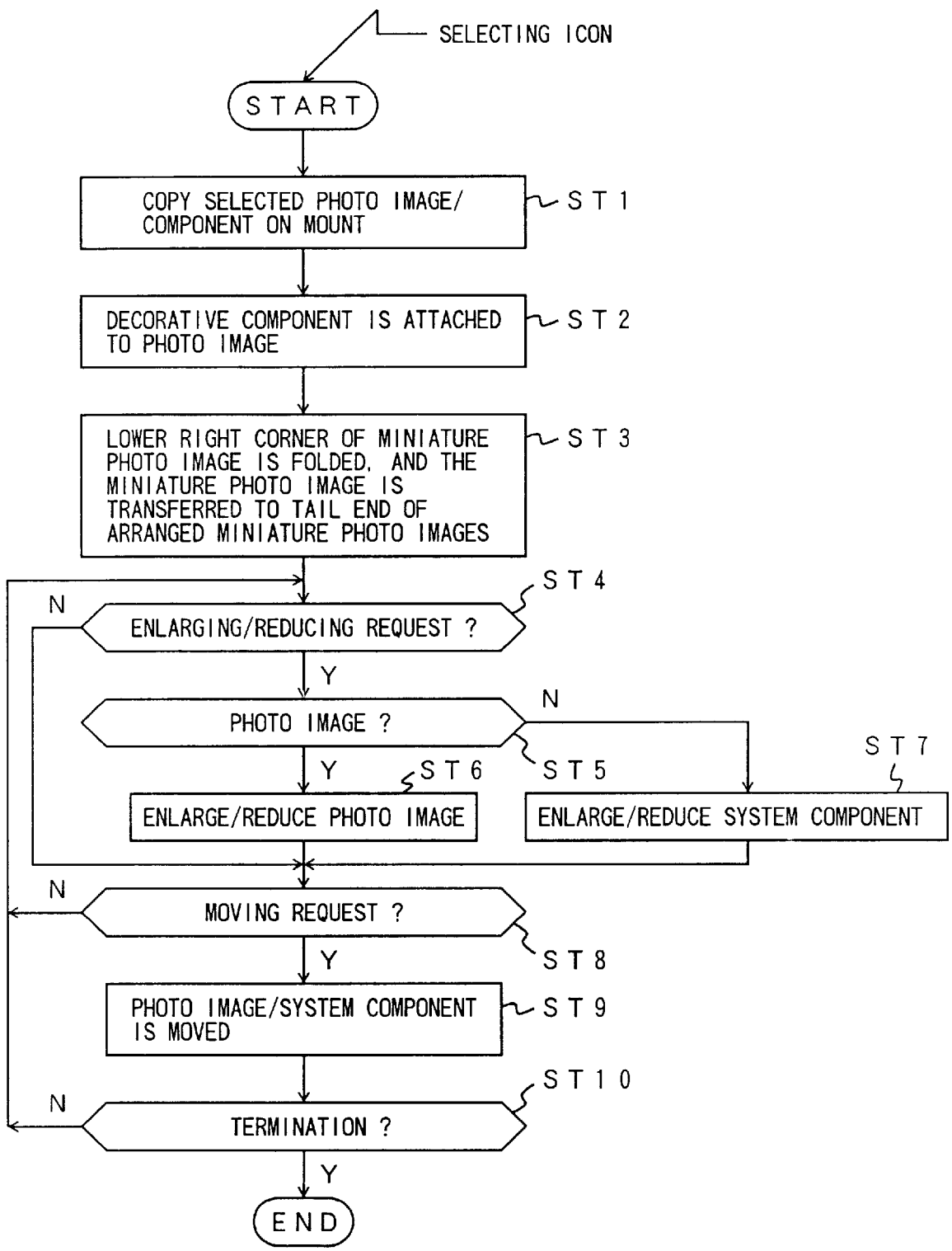
FIG. 20 is a flowchart illustrating a process executed by the album editing program.

As has been described above, in the album editing process executed in accordance with the procedure shown in FIG. 20, photo images are enlarged/reduced without changing the ratio of length to width. System components are enlarged/ reduced in a manner desired by the user. The photo images and the system components set on the mount 70 in the album editing process are managed in the album directory 94, as show in FIG. 9, using pointer information.

When the lower right corner of the mount 70 is clicked, the next page (the next mount) of the electronic photo album is opened on the screen of the display unit 83. As a result, the next page of the electronic photo album can be edited. When the lower left corner of the mount 70 is clicked, the page of the electronic photo album goes back to the previous page (the previous mount) on the screen of the display unit 83. As a result, the previous page of the electronic photo album can be edited again.

In a case where a photo frame component (a figure component on which a photo image should be set) is set on the mount 70, to rotate, move, and enlarge/reduce the photo frame and photo images thereon, the album editing program 89 executes a special process. In this case, the album editing program 89 executes the special process in accordance with a procedure as shown in FIG. 22.

Figure 22:
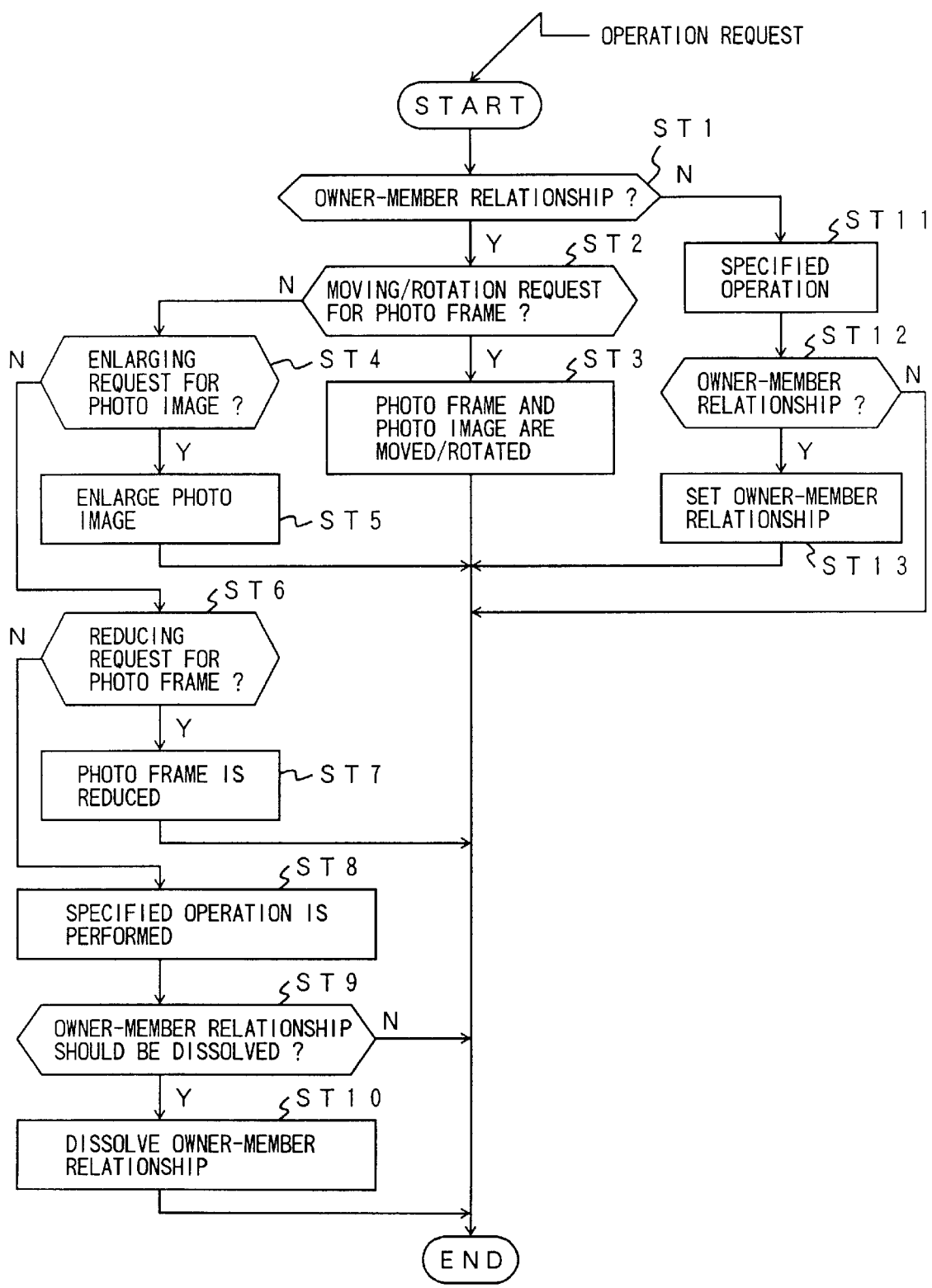
FIG. 22 is a flowchart illustrating a process executed by the album editing program.

Referring to FIG. 22, when an operation request (a moving/rotation request or an enlarging/reducing request) is issued for a photo frame component or a photo image, it is determined, in step ST1, whether there is the owner-member relationship between a photo frame component and a photo image. The owner-member relationship is set by the album editing program 89.

Figure 23A:
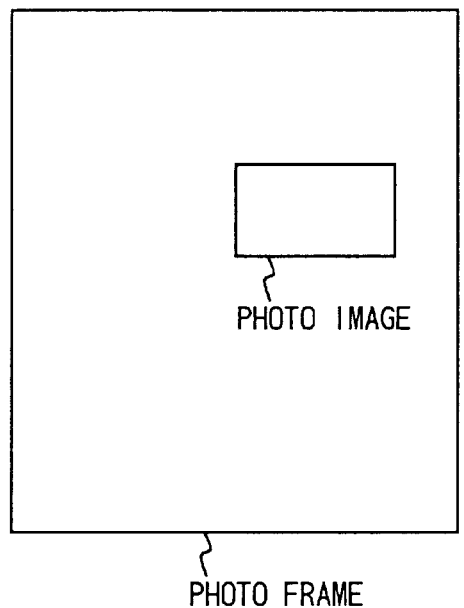
FIG. 23A is a diagram illustrating a state where a photo image is placed on a photo frame component.
Figure 23B:
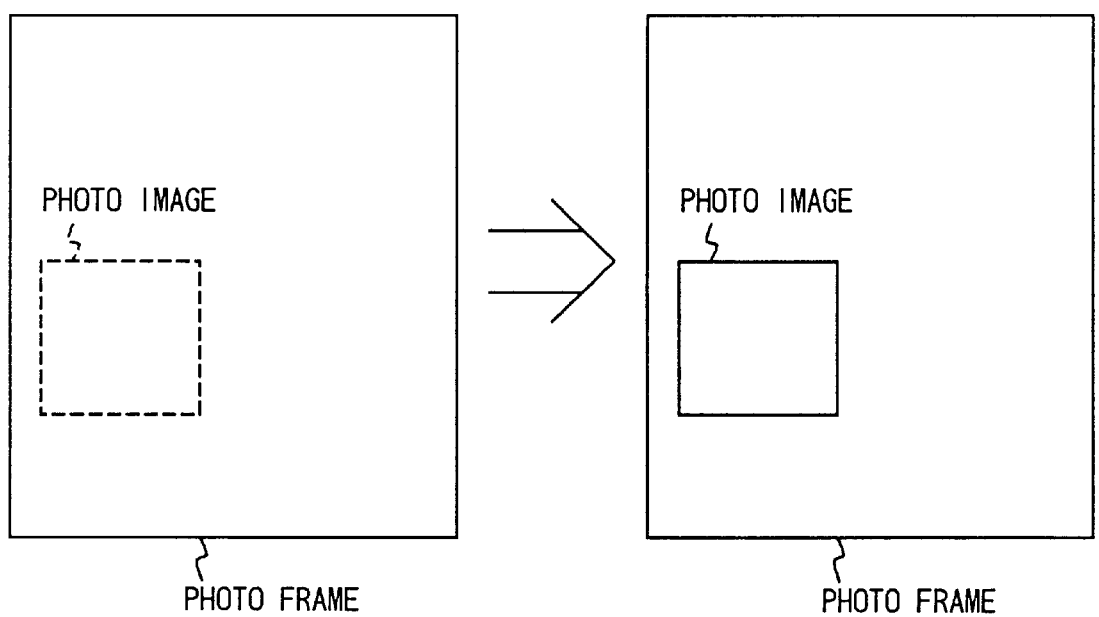
FIG. 23B is a diagram illustrating a state where a photo image under a photo frame component is transferred so as to be set on the photo frame component.

As shown in FIG. 23A, when a photo image is transferred to a photo frame component so as to be set on the photo frame component, the owner-member relationship between the photo frame component and the photo image is set. In addition, as shown in FIG. 23B, when a photo frame component is transferred to a photo image so as to cover the photo image, the owner-member relationship between the photo frame component and the photo image is set. In the latter case, the album editing program 89 executes a process to transfer the photo image from under the photo frame component to the photo frame component.

When it is determined, in step ST1, that there is the owner-member relationship between the photo frame component and the photo image, it is further determined, in step ST2, whether the issued operation request is a moving/rotation request for the photo frame component. When it is determined that a moving/rotation request has been requested for the photo frame component, the photo frame component and a photo image with the owner-member relationship between the photo frame component and photo image are moved or rotated together with each other, in step ST3. In this case, when the rotation icon 118 is clicked, the rotation request is issued.

On the other hand, when it is determined, in step ST2, that the issued operation request is not the moving/rotation request for the photo frame component, it is further determined, in step ST4, whether the operation request is an enlarging request for the photo image. When it is determined that an enlarging request has been issued for the photo image, the photo image is enlarged in step ST5. In this case, the enlargement of the photo image is limited so that the enlarged photo image does not exceed an area of the photo frame component with the owner-member relationship between the photo image and it.

When it is determined, in step ST4, that the operation request is not an enlarging request for the photo image, it is further determined, in step ST6, whether the operation request is a reducing request for the photo frame component. When a reducing request for the photo frame component has been issued, the photo frame component is reduced in step ST7. In this case, the reducing of the photo frame component is limited so that the photo image with the owner-member relationship between the photo frame component and it does not exceed the reduced photo frame component.

On the other hand, when it is determined, in step ST6, that the operation request is not the reducing request for the photo frame component, a process corresponding to the operation request is performed in step ST8. For example, the photo image is transferred in accordance with the operation request. After this, it is determined, in step ST9, whether the owner-member relationship between the photo frame component and the photo image should be dissolved. When it is determined that the owner-member relationship between the photo frame component and the photo image should be dissolved, the owner-member relationship between the photo frame component and the photo image is dissolved. On the other hand, when it is determined that the owner-member relationship between the photo frame component and the photo image should not be dissolved, the process is terminated.

If it is determined, in step ST1, that the owner-member relationship regarding a photo frame component or a photo image for which the operation request is issued is not set, a process is performed in accordance with the operation request, in step ST11. After this, it is determined, in step ST12, whether a photo frame component and a photo image are in a state where the owner-member relationship exists. If a photo frame component and a photo image are in the state where the owner-member relationship exists, the owner-member relationship between the photo frame component and the photo image is set in step ST13 and the process is terminated. If the photo frame component and the photo image are not in the state where the owner-member relationship exists, the process is immediately terminated.

As has been described above, in a case where a photo frame component is set on the mount 70, if there is a photo image with the owner-member relationship between the photo frame component and the photo image, the photo frame component and the photo image are moved and rotated together with each other. The photo image is enlarged under a condition in which the enlarged photo image does not exceed the area of the photo frame component. Further, the photo frame component is reduced under a condition in which the photo image does not exceed the area of the reduced photo frame component.

Figure 24:
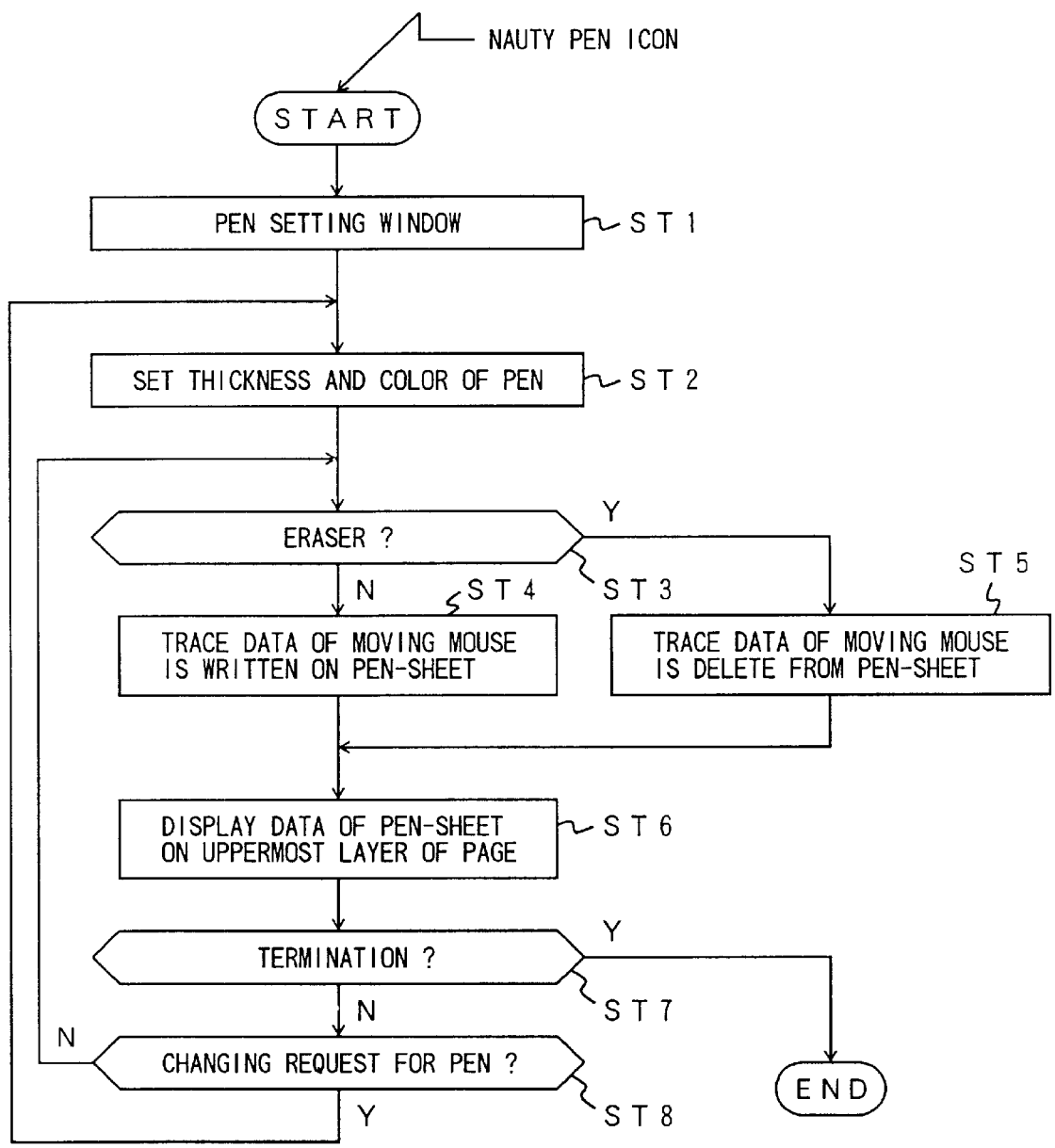
FIG. 24 is a flow chart illustrating a process executed by the album editing program.

When the naughty pen icon 123 on the album editing screen is clicked, the album editing program 89 executes a process in accordance with a procedure as shown in FIG. 24.

Figure 25:
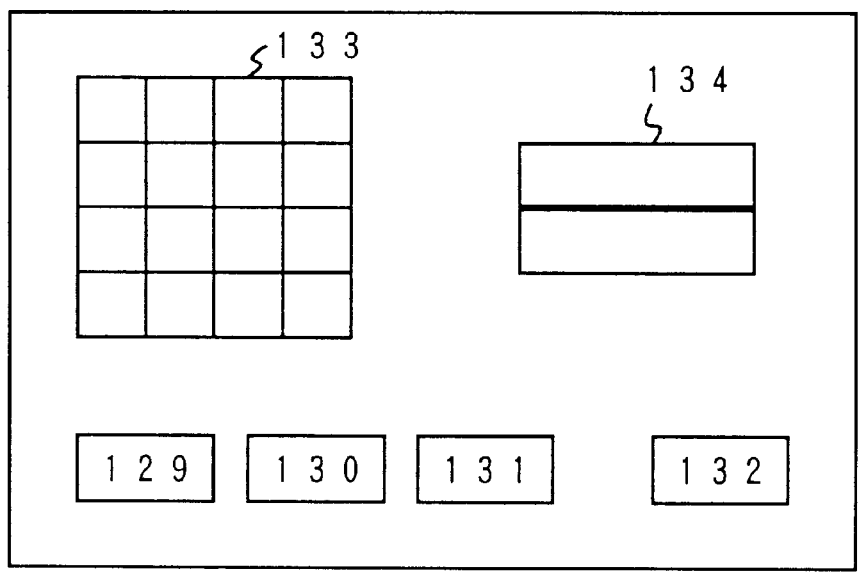
FIG. 25 is a diagram illustrating a screen used to setting a pen.

Referring to FIG. 24, first, a pen setting window is opened near the naughty pen icon 123 in step ST1. The pen setting window is provided, as shown in FIG. 25, with icons 129–132, a color palette 133 and a display area 134. The icon 129 is used to select a thick pen. The icon 130 is used to select a medium thickness pen. The icon 131 is used to select a thin pen. The icon 132 is used to select an eraser. The color palette 133 has a plurality of colors and is used to select a color from the plurality of colors. A sample of a line having a thickness selected by one of the icons 129–132 and a color selected from the color palette 133 is displayed on the display area 134.

After the pen setting widow is opened, when the user clicks one of the icons 129–131 and one of the colors in the color palette 133, a thickness of a pen corresponding clicked icon and a clicked color are set in the system, in step ST2. It is determined, in step ST3, whether the icon 132 is clicked to select the eraser. When the eraser is not selected, that is, when the pen is selected, figure data of a trace of a cursor moved by the mouse 85 is written in the pen-sheet 95 (see FIG. 9) in step ST4. On the other hand, when the eraser is selected, figure data of a trace of a cursor moved by the mouse 85 is deleted from the pen-sheet 95 in step ST5.

After this, lines corresponding to the figure data stored in the pen-sheet 95 is displayed with the selected thickness and color on the uppermost layer of the page (the mount 70) of the electronic photo album, in step ST6. After the lines (handwritten characters and/or handwritten lines) are formed on the screen, it is determined, in step ST7, whether a termination request for the pen-drawing process is issued. If the termination request has not yet been issued, it is further determined, in step ST8, whether a changing request has been issued for changing the thickness and the color of the pen. If the changing request is issued, the process returns to step ST2. On the other hand, if it is determined that the changing request has not yet been issued, the process returns to step ST3.

Figure 26:
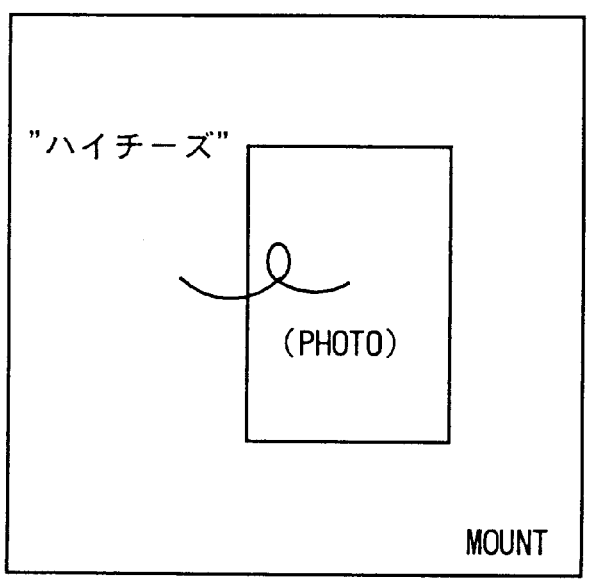
FIG. 26 is a diagram illustrating a mount on which handwritten characters are set.

As has been described above, when the naughty pen icon 123 is clicked, lines corresponding to the traces of the cursor moved by the mouse 85 can be drawn on the mount 70, photo images and figure components. In addition, the drawn lines can be erased by the operation of the mouse 85. As a result, handwritten characters and handwritten lines can be formed, as shown in FIG. 26, on the mount 70, the photo image and the figure component.

Figure 27:
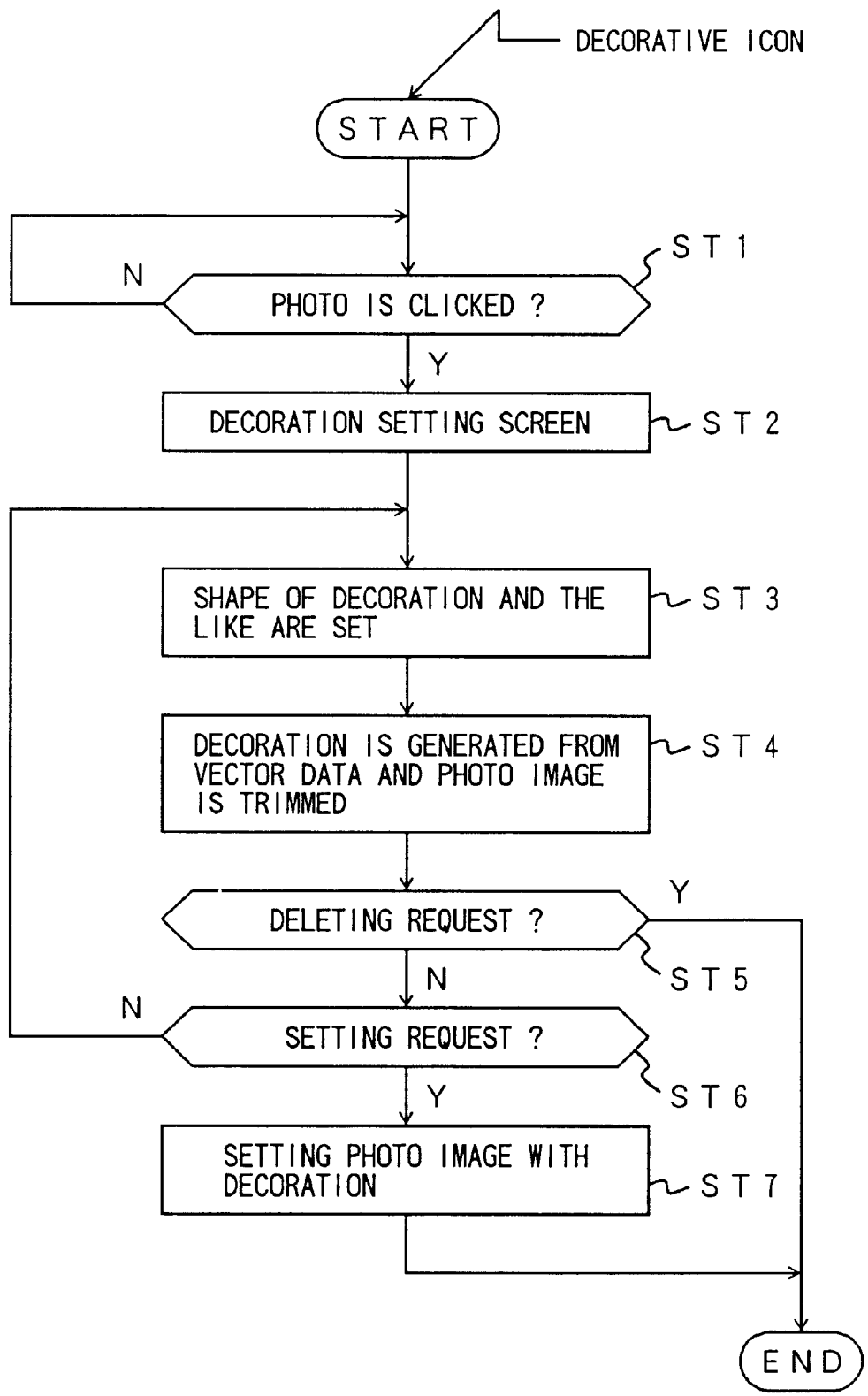
FIG. 27 is a flowchart illustrating a process executed by the album editing program.

When the decoration icon 122 on the album editing screen is clicked, the album editing program 89 executes a process in accordance with a procedure as shown in FIG. 27.

Figure 28:
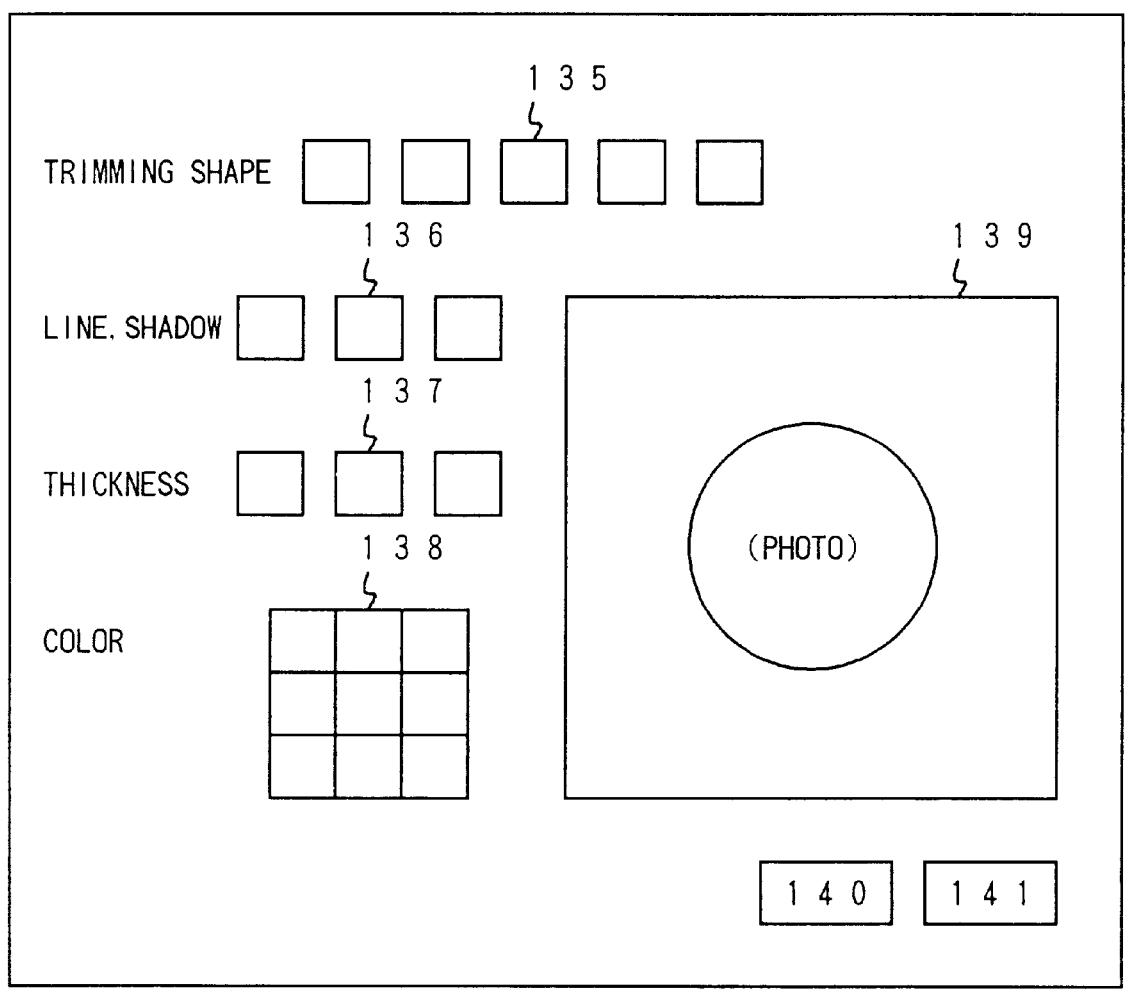
FIG. 28 is a diagram illustrating a screen used for a process for setting decorations.

Referring to FIG. 27, first, the system is waiting for a photo image to be clicked (ST1). When it is determined, in step ST1, that a photo image has been clicked, a decoration setting screen is opened on the display unit 83 in step ST2. The decoration setting screen is formed as shown in FIG. 28. That is, the decoration setting screen is provided with icons 135–137, a color palette 138, a display area 139, a setting icon 140 and a deleting icon 141. The icons 135 are used to select a shape of a trimmed photo image. The icons 136 are used to select states of an outline and shadow of a trimmed photo image. The icons 137 are used to select a thickness of the outline of a trimmed photo image. The color palette 138 is used to select a color of the outline of a trimmed photo image. On the display area 139, a photo image which is trimmed in a selected mode is displayed. The setting icon 140 is used to instruct a clicked photo image to change to a photo image displayed in the display area 139. The deleting icon 141 is used to instruct to deletion of a photo image from the display area 139.

Returning to FIG. 27, in step ST3, the shape of a decoration and the thickness, the color and the shadow of the outline of a trimmed photo image are set in accordance with clicking operations for icons. A decoration is generated from vector data in step ST4. A clicked photo image is then trimmed so as to fit into the decoration. The photo image with the decoration is displayed on the display area 139 and enlarged and/or reduced, so that the desired shaped photo image with the decoration is decided.

It is then determined, in step ST5, whether a deleting request for deleting the photo image displayed in the display area 139 has been issued. When the deleting request is issued, the photo image is deleted from the display area 139 and the process is terminated. When the deleting request has not been issued, it is further determined, in step ST6, whether a setting request for the photo image displayed in the display area 139 has issued. If the setting request has not been issued, the process returns to step ST3. On the other hand, if the setting request is issued, the photo image displayed on the display area 139 is substituted for the clicked photo image.

Figure 29:
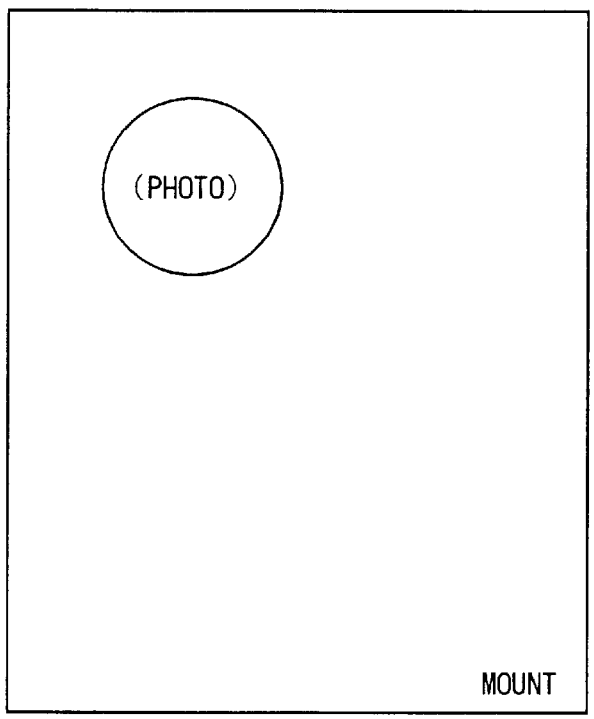
FIG. 29 is a diagram illustrating a photo image which is trimmed on the mount.
Figure 30:
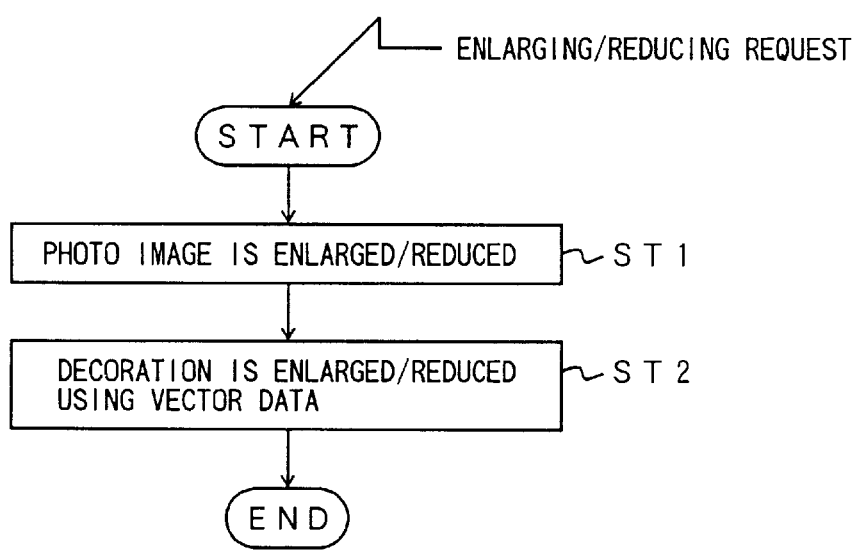
FIG. 30 is a flowchart illustrating a process executed by the album editing program.

When the decoration icon 122 is clicked, the album editing program 89 executes the process described above so that a photo image set on the mount 70 is trimmed in a desired shape as shown in FIG. 29. In this state, when an enlarging/reducing request is issued, the trimmed photo image with the decoration is not directly enlarged/reduced. In this case, the album editing program 89 executes a process in accordance with a procedure as shown in FIG. 30.

That is, the original photo image (not the trimmed photo image) pointed out by the pointer information in the album directory 94 (see FIG. 9) is enlarged/reduced in step ST1. The decoration is then enlarged/reduced using the vector data in step ST2. The enlarged/reduced photo image is trimmed so as to fit in the enlarged/reduced decoration. According to the process as described above, the indentation of the outline of the trimmed photo image can be prevented from being enlarged.

A "circle", a "heart" and the like are prepared as the trimming shape in the system. The album editing program 89 executes a process for trimming a photo image in the "heart" shape in accordance with the following procedure. As a result, a photo image trimmed in the "heart" shape can be obtained without using complex curve expressions.

Figure 31A:
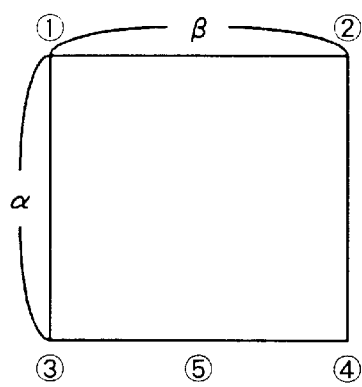
FIGS. 31A and 31B are diagrams illustrating a heart-shaped component.
Figure 31B:
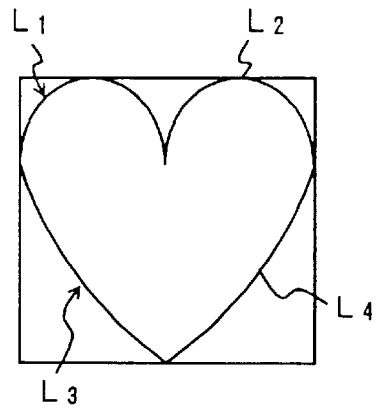

As shown in FIG. 31A, four corners of a square which should surround the "heart" are defined as ①②③④. The center between the corners ③ and ④ is defined as ⑤. The height of the square is defined as $\alpha$ and the width of the square is defined as $\beta$. Referring to FIG. 31B, a first sub-square having a height of $(2/5)\cdot\alpha$ and a width of $(1/2)\cdot\beta$ is set in the square such that a upper left corner of the sub-square is positioned at the corner ① of the square. An arc L1, in a range of $0-\pi/2$ radian, of an ellipse which is inscribed in the first sub-square is defined as a upper left part of the "heart". A second sub-square having a height of $(2/5)\cdot\alpha$ and a width of $(1/2)\cdot\beta$ is set in the square such that a upper right corner of the sub-square is positioned at the corner ② of the square. An arc L2, in a range of $\pi/2-\pi$ radian, of an ellipse which is inscribed in the second sub-square is defined as a upper right part of the "heart".

A third sub-square having a height of $(2/3)\cdot\alpha$ and a width of $(1/2)\cdot\beta$ is set in the square such that a upper left corner of the third sub-square is positioned at the corner ① of the square. An ellipse A which is inscribed in the third sub-square is formed. In addition, a fourth sub-square having a height of $(2/3)\cdot\alpha$ and a width of $(1/2)\cdot\beta$ is set in the square such that a upper right corner of the fourth sub-square is positioned at the corner ② of the square. An ellipse B which is inscribed in the fourth sub-square is formed. A line between the point ⑤ and a point of contact of a tangential line on the ellipse A and an arc of the ellipse A in a range between a point corresponding to $\pi/2$ radian and the point of contact are combined with each other so that a lower left part L3 of the "heart" is formed. A line between the point ⑤ and a point of contact of a tangential line on the ellipse B and an arc of the ellipse B in a range between the point of contact and a point corresponding to $\pi/2$ radian are combined with each other so that a lower right part L4 of the "heart".

As has been described above, the "heart" shape can be formed by combination of simple arcs and lines.

Figure 32:
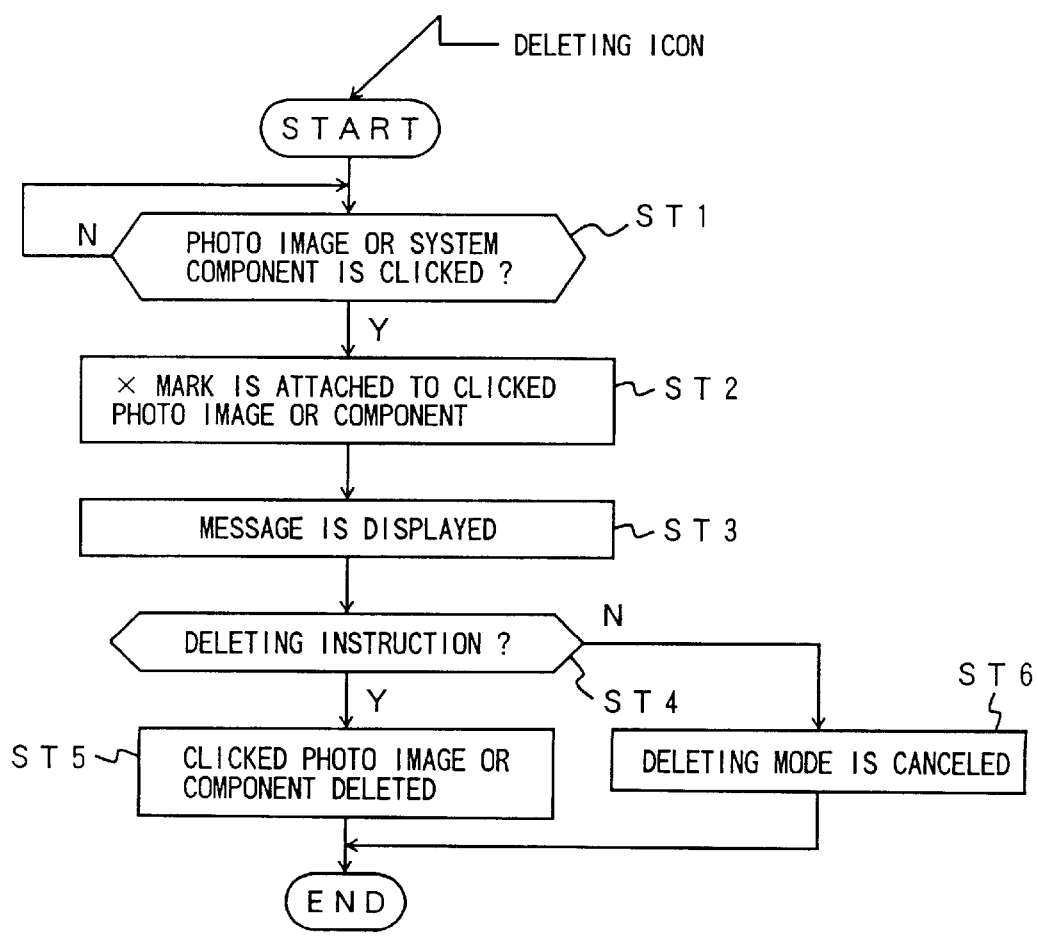
FIG. 32 is a flowchart illustrating a process executed by the album editing program.
Figure 33:
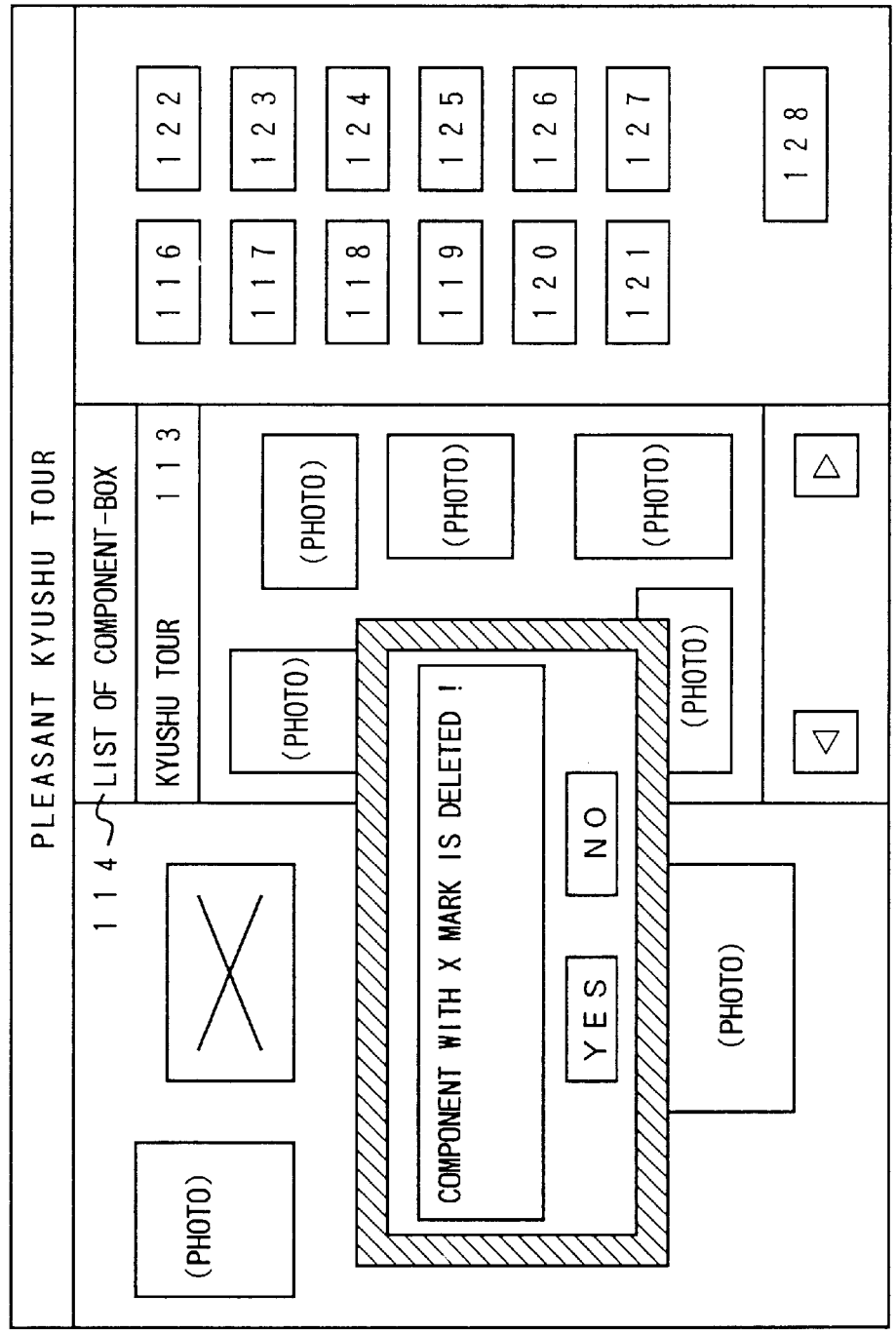
FIG. 33 is a diagram illustrating a screen used for a process for deleting components.

When the deleting icon 127 on the album editing screen is clicked, the album editing program 89 executes a process in accordance with a procedure as shown in FIG. 32.

Referring to FIG. 32, the system is waiting for a photo image or a system component to be clicked in step ST1. It is determined, in step ST1, whether a photo image or a system component has been clicked, a X mark is attached to the clicked photo image or system component, in step ST2. A message confirming whether the clicked photo image or system component should be deleted is indicated on the album editing screen in step ST3. It is then determined, in step S4, whether an instruction for deleting the clicked photo image or system component is supplied by the user. When an instruction for deleting the clicked photo image or system component is supplied, the photo image or system component to which the X mark is attached is deleted in step S5. On the other hand, when no instruction is supplied, the X mark is deleted and the deleting mode is canceled in step ST6.

As has been described above, when the deleting icon is clicked, after the X mark is attached to a photo image or a system component and the message is displayed, the photo image or the system component is deleted in accordance with an instruction from the user.

A detailed description will now be given of the management of various kinds of data used in the electronic photo album editing apparatus as described above and the album editing process based on the various kinds of data.

The various kinds of data used in the electronic photo album editing apparatus are managed based on a data directory as shown in FIG. 34.

Referring to FIG. 34, the data directory is formed of an "album management file", an "album directory", a "photo management file", a "picture directory", a "component management file" and a "component directory". The "album management file" indicates a relationship between a title and a term in the "album directory" for each album. Thus, when a title is specified, a term in the "album directory" is specified. That is, the contents of data about the album is specified.

The "album management file" is formed as shown in FIG. 35. That is, the "album management file" is provided with the "album directory" for an album and a management state of the album. The "album directory" represents a title of the album and data about the album. The management state indicates whether the album is opened in the electronic photo album editing apparatus.

Returning to FIG. 34, each "album directory" corresponds to an album. The "album directory" manages an "album information file", a "voice file" and a "pen sheet file". The "album information file" is formed of the size of the album and a list of information items forming respective pages of the album as will be describe later. The "voice file" indicates voice information which should be attached to the album. The "pen sheet file" indicates files of figure data (handwritten character etc.) which are inserted in the album.

The "photo management file" manages a relationship between a photo-box and the "picture directory" storing photo data belonging to the photo-box. The "photo management file" is formed as shown in FIG. 7. Each "picture directory" is provided with a file (see FIG. 5) of photo data representing a photo image and a miniature file. The miniature file is a file of miniature photo data which is obtained by reducing the photo image represented by the photo data. The miniature photo data represents miniature photo images corresponding to photo images, belonging to the photo-box, which are displayed in the working display area 115 (see FIG. 18).

The "component management file" manages a relationship between a title of a component-box and the "component directory" storing component data belonging to the component-box. The "component management file" is formed as shown in FIG. 8. Each "component directory" is provided with a file (see FIG. 6) storing a component data representing a component (e.g., a photo frame) and a miniature file. The miniature file is a file of miniature component data which is obtained by reducing the component represented by the component data. The miniature component data represents components, belonging to the component-box, which are displayed in the working display area 115 (see FIG. 19).

The "album information" described above is formed as shown in FIG. 36.

Referring to FIG. 36, the "album information" is a "a screen size (including a solution of the screen)", an "auto-demo time (a time assigned to each page for automatically opening pages)" and "page information" indicating information about a page of the album. The "page information" further indicates an amount of information about a page, a name of the voice file, a name of the pen sheet file, mount information, photo image information, component information and character information. The mount information is formed of a kind of mount (e.g., the diary mount, the color mount or the like (see FIG. 19)) and a file name of the mount. The photo information is formed of a file name of photo data representing a photo image and photo-CD in which the photo data is stored, a position at which the photo image is played on the page, the size of the photo image and trimming information indicating a part of the photo image which should be displayed.

The component information is formed of a file name of a component, a position at which the component is located on the page and the size of the component. The character information is formed at a position at which a character is located on the page, a color of the character, a font, a style, a size and a character string including the character.

Based on the various information managed by the data directory as has been described above, a photo-box organizing process for organizing photo images belonging to a photo-box and an album editing process using photo images belonging to the photo-box are performed.

Figure 37:
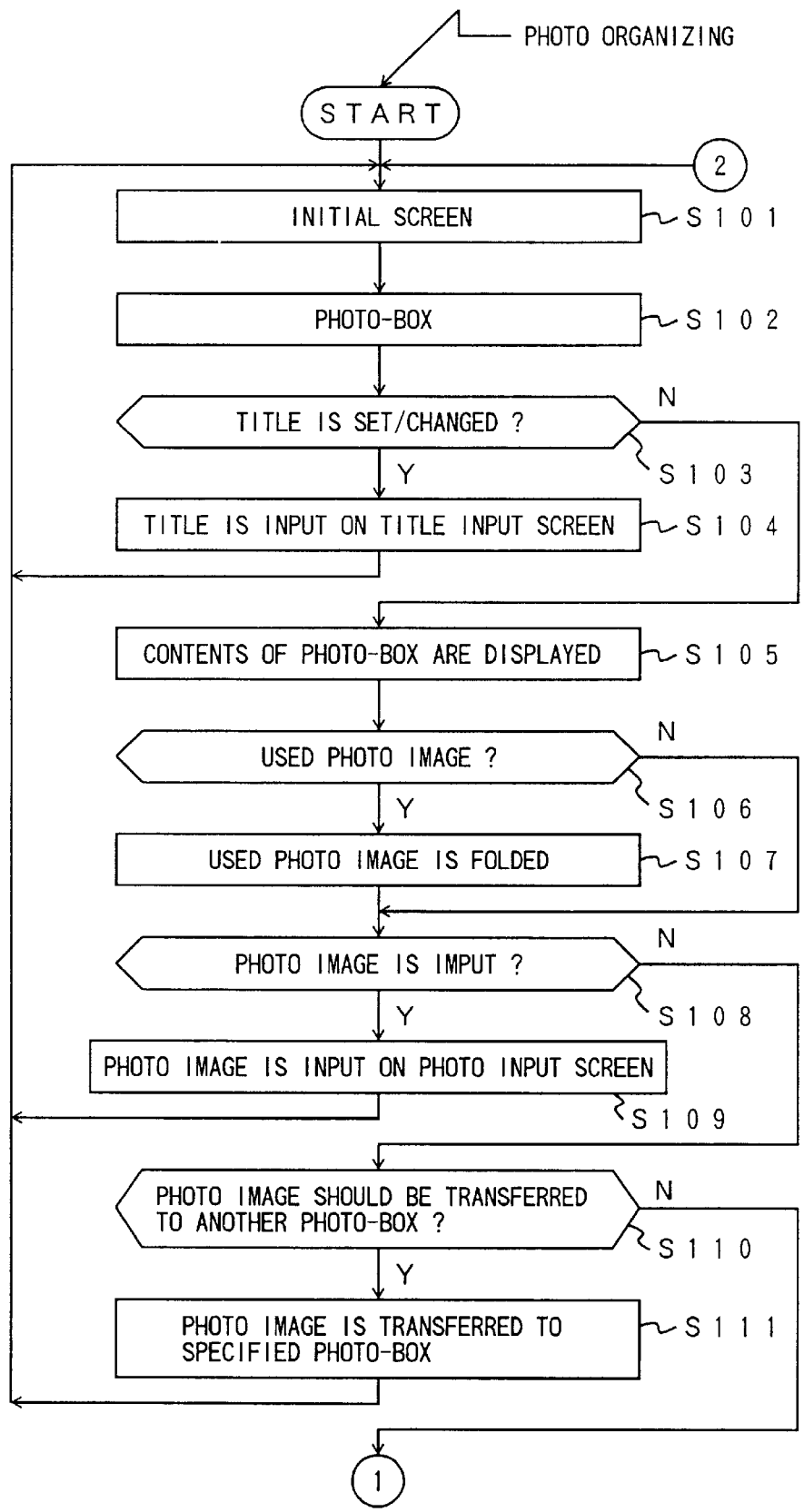
FIGS. 37 and 38 are flowcharts illustrating a process for organizing a photo-box.
Figure 38:
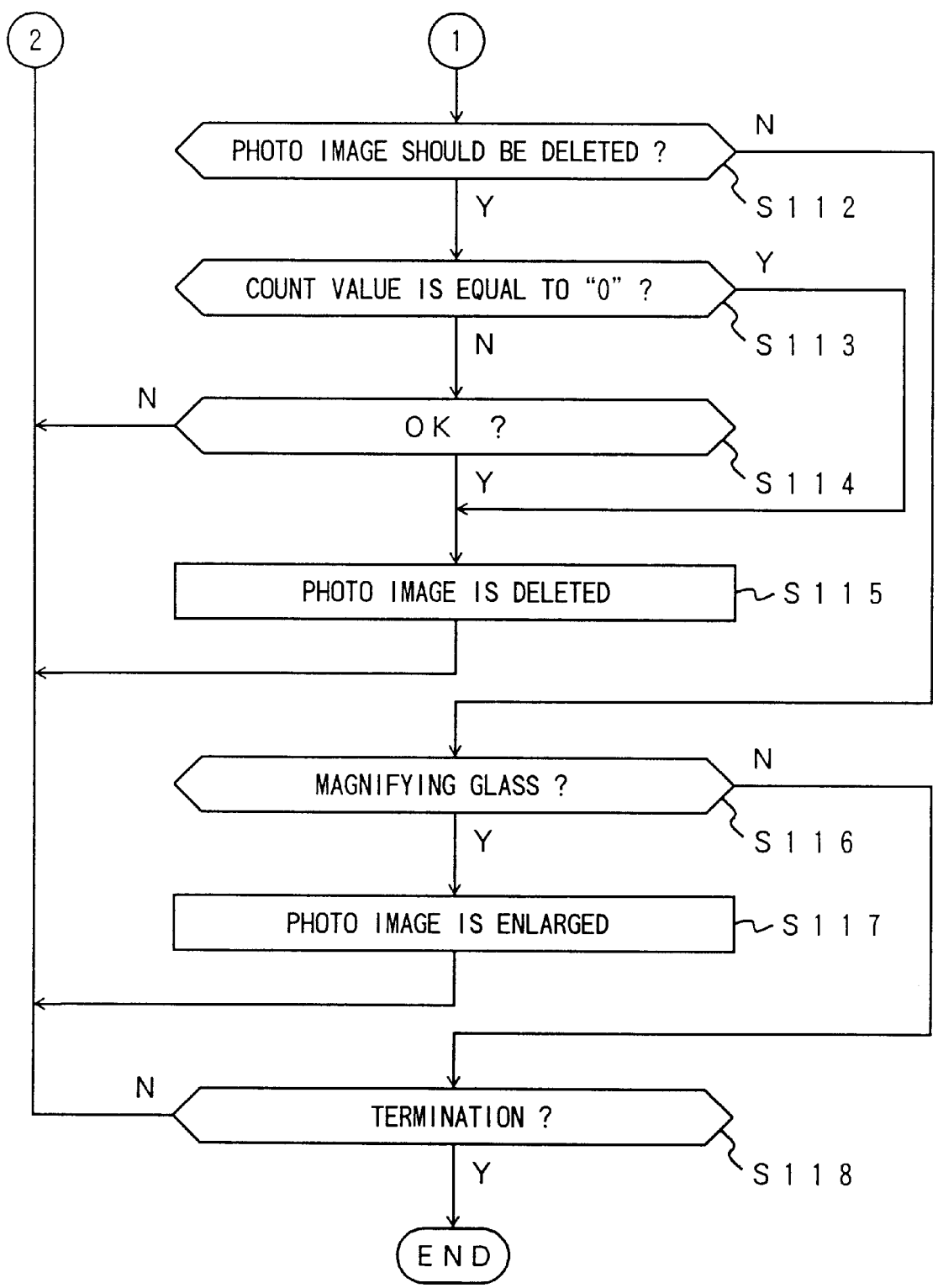

First, the photo-box organizing process is performed in accordance with a procedure as shown in FIGS. 37 and 38.

When an icon for the "photo-box organizing" process (see FIG. 11) is clicked, the photo-box organizing process starts. Referring to FIG. 37, an initial screen (see FIG. 14) for the photo-box organizing process is opened in step S101. When one of the photo-boxes in a list of icons displayed on the initial screen is clicked in step S102, it is determined, in step S103, whether an icon for setting or changing a title has been clicked (selected). When it is determined that the icon for setting or changing a title has been clicked, an input screen for a title is formed on the display unit 83 in step S104. When title information is input from the keyboard, the title of the photo-box managed by the photo management file (see FIG. 34) is set or changed to a new title represented by the input title information.

On the other hand, when the selecting operation of setting or changing the title of the photo-box is not performed but only an operation for selecting a photo-box is performed (S102 and S103), the photo management file (see FIG. 34) is searched for a picture directory corresponding to the selected photo-box. The miniature photo data of the miniature file belonging to the picture directory is read out, and the miniature photo images are displayed on the screen (S105). It is then determined, in step S106, whether photo images belonging to the photo-box include a photo image which has been used for an album. If there is a photo image used for an album, the lower right corner of a miniature photo image corresponding to the used photo image is folded (the working display area 101 shown in FIG. 14), in step S107. In this state, it is further determined, in step S108, whether an icon for taking a photo image has been clicked (selected).

If the icon for taking a photo image is clicked, a photo taking screen (see FIG. 15) is opened in step S109. A photo image based on photo data supplied, for example, from the image scanner is displayed on the display area 102 of the photo taking screen. A new photo data file for the photo data taken into this system is generated and stored in the disk unit. A picture directory to which the photo data file belongs is generated. A miniature file for miniature photo data representing miniature photo images is generated and stored in a predetermined area of the disk unit. The miniature file is recorded in the picture directory for the corresponding photo image. A relationship between the selected photo-box and the new picture directory is described in the photo management file. After this, a process for taking a photo image is completed.

If the process for taking a photo image is not selected, it is further determined, in step S110, whether an icon for a photo-box moving process has been clicked (selected). When the icon for the photo-box moving process is clicked, the electronic photo album editing apparatus starts to wait for an operation for selecting photo images, belonging to the selected photo-box, displayed on the working display area 101 (see FIG. 14) and an operation for specifying a photo-box to which selected photo images should be transferred. When these operations are performed, a process for transferring photo data, corresponding to a selected photo image, to a selected photo-box in step S111 is performed. That is, the photo management file is updated so that a picture directory having a photo data file for the selected photo image corresponds to the selected photo box (see FIG. 34). After this, the photo-box moving process is completed.

On the other hand, if the icon for the photo-box moving process is not clicked, the process proceeds to step S112 shown in FIG. 38.

That is, it is determined, in step S112, whether an icon for deleting photo data has been clicked (selected). When the icon for deleting a photo image is clicked, the electronic photo album editing apparatus waits for a photo image which should be deleted to be specified. In this state, when a photo image (a miniature photo image) displayed on the working display area 101 of the screen is clicked, it is further determined, in step S113, whether the count value of a counter for the selected photo image in the photo management file is equal to "0". The count value of the counter for the selected photo image corresponds to a number of albums for which the selected photo image is being used. Thus, a state where the count value of the counter is not equal to "0" means that the selected photo image is used in some of the albums. On the other hand, a state where the count value of the counter is equal to "0" means that the selected photo image is not used for any albums. If the count value of the counter for the selected photo image is equal to "0", the selected photo image is deleted from the selected photo-box in step S115. That is, the photo management file (see FIG. 34) is updated so that the relationship between the directory of the photo data file corresponding to the selected photo image and the photo-box is deleted. In addition, if the count value of the counter for the selected photo image is not equal to "0", the electronic photo album editing apparatus asks the user whether the selected photo image should be deleted from the selected photo-box in step S114. If the user performs an operation for permission to delete the selected photo image, the selected photo image is deleted from the selected photo-box in step S115. After this, the process for deleting the photo data is completed.

Further, when the icon for deleting photo data is not clicked (selected), it is determined, in step S116, whether an icon for a magnifying glass process has been clicked (selected). When the icon for the magnifying glass is clicked, the electronic photo album editing apparatus waits for an operation for selecting a photo image (a miniature photo image) displayed on the working display area 101 of the screen (see FIG. 14) to be selected. When a photo image (a miniature photo image) is clicked (selected), an enlarging display screen is formed on the display unit. Enlarged photo data is generated so that an enlarged photo image corresponding to the selected photo image is obtained. An enlarged photo image based on the enlarged photo data is displayed on the enlarging display screen of the display unit, in step S117. After this, the magnifying glass process is completed. The user can look at the enlarged photo image, and can confirm the details of the photo image.

After this, the electronic photo album editing apparatus determines, in step S118, whether a terminating operation has been performed. If the terminating operation is performed, all the processes for organizing the photo-box are terminated.

Figure 39:
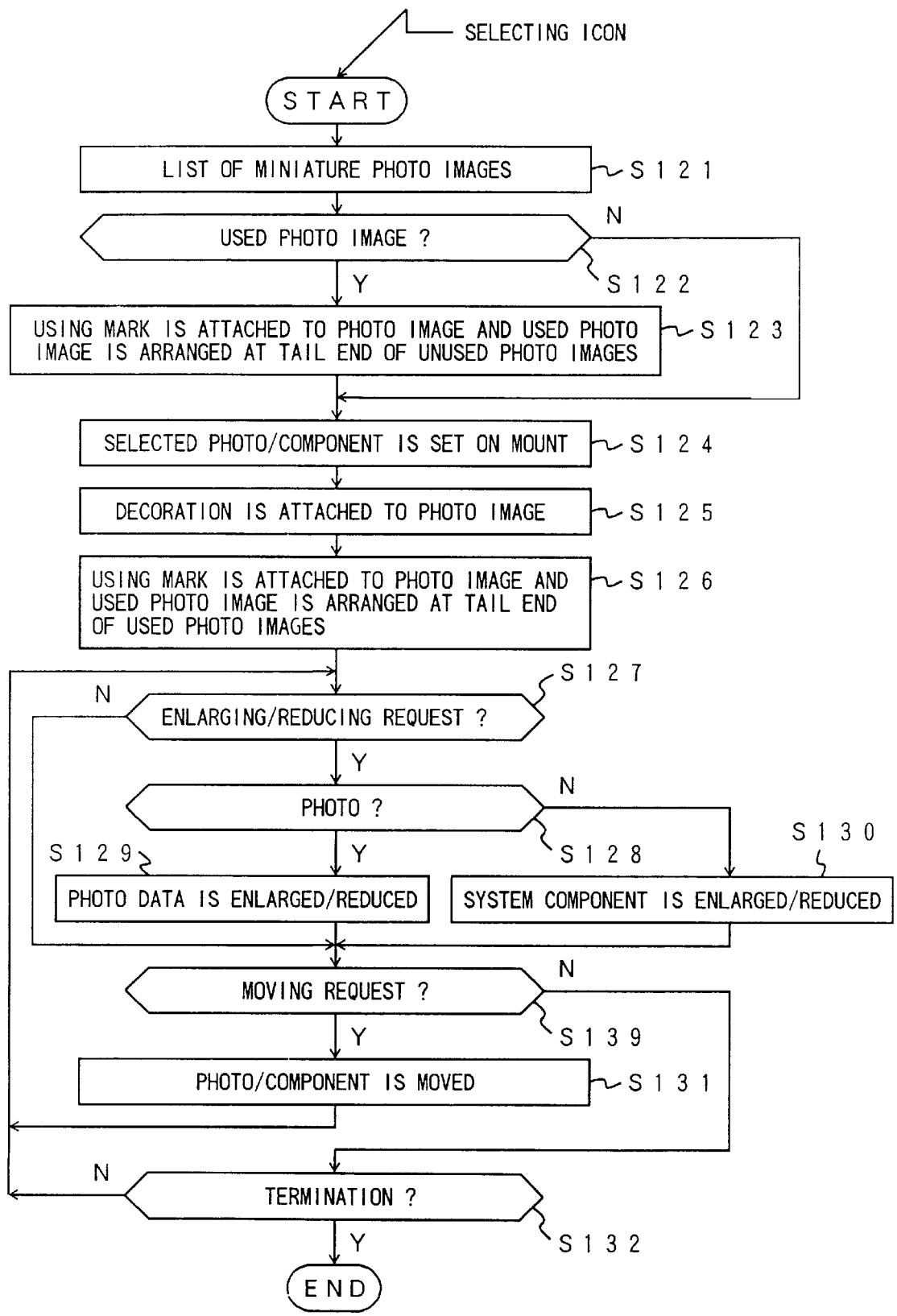
FIG. 39 is a flowchart illustrating a process for editing an electronic photo album.

Processes for editing the electronic photo album are executed in accordance with a procedure as shown in FIG. 39.

In the initial screen (see FIG. 11), when the icon for the album editing process is clicked (selected), the processes shown in FIG. 39 start. In a state where the album editing screen (see FIG. 18) is formed on the display unit, when an icon of a photo-box to which photo images used to edit the photo album is clicked (selected), miniature files described in the respective picture directories corresponding to the clicked photo-box are extracted with reference to the photo management file (see FIG. 34). Based on miniature photo data of the extracted miniature files, a list of miniature photo images corresponding to the photo images belonging to the selected photo-box is displayed on the working display area 115 (S121). The miniature photo images are arranged in a predetermined order.

It is determined, in step S122, whether there is a photo image which has been used for the photo album in the photo images belonging to the selected photo-box. If there is a used photo image, the lower right corner portion of a miniature photo image corresponding to the used photo image is folded. The photo data corresponding to the used photo image is sorted so as to be arranged after photo data corresponding to photo images which have not been used (S123). Thus, photo images which have not been used are arranged at former positions, so that miniature photo images corresponding to the photo images which have not been used are arranged at upper positions in the working display area 115. As a result, the miniature photo images corresponding to the photo images which have not been used can be easily selected (clicked).

After this, the electronic photo album editing apparatus waits for photo images and components (a mount, a photo frame and the like) to be input. A mount is selected, the selected mount is displayed in an area 70 adjacent to the working display area 115 on the screen (see FIG. 18). The type of the selected mount and a file name for the selected mount are described in the "album information file" (see FIG. 36).

When a miniature photo image displayed in the working display area 115 is clicked, the respective picture directories (see FIG. 34) are searched. Photo data in a photo data file corresponding to a miniature file of the selected miniature photo image is then read out. A photo image represented by the photo data is displayed so as to be placed on the mount which has been displayed (S124). At this time, a position at which the photo image is placed is adjusted by operations of the mouse. Data, such as a file name, a position, and a size, about the photo image placed on the mount is described as the photo information in the album information file (see FIG. 36).

In a case where a decorative component for the photo image has been decided as the default condition, when the photo image is selected, the decorative component is simultaneously selected and placed on the mount (S125).

The lower right corner portion of the miniature photo image corresponding to the photo image set on the mount is folded. The photo data corresponding to the selected photo image is sorted so as to be arranged after photo images which have not been used. For example, the miniature photo image corresponding to the selected photo image is placed at the tail end of the arrangement of miniature photo images.

After this, it is determined, in step S127, whether a request for enlarging/reducing the photo image or the component set on the mount has been issued. When the request is issued, it is further determined, in step S128, whether the request has been issued for the photo image. If the request is issued for the photo image, the photo data is enlarged or reduced without changing the ratio of length to width (S129). On the other hand, if the request is issued for the component (not the photo image), a process for enlarging or reducing the component at a specified magnification is performed (S130).

It is determined, in step S139, whether a request for moving the photo image or the component set on the mount has been issued. If the request is issued, the electronic photo album editing apparatus waits for an operation for moving the photo image or the component on the mount. When the operation for moving the photo image or the component is performed (e.g., a pointer drag), the photo image or the component is moved on the mount (S131). Photo information or component information in the album information file (see FIG. 36) is updated using a position to which the photo image or the component is transferred. After this, the process returns to step S127.

On the other hand, when the request for moving the photo image or the component has not been issued, it is further determined, in step S132, whether a request for terminating the photo album editing process has been issued. If the request is issued, the photo album editing process is completed. If it is determined that the request has not been issued, the process returns to step S127.

In the photo album editing apparatus as has been described above, miniature photo images corresponding to the photo images belonging to each photo-box are displayed on the screen of the display unit. when a miniature photo image corresponding to a photo image which should be set on the photo album is selected, the lower right corner portion of the selected miniature photo image is folded. Thus, a user can recognize, at a glance, photo images which have not been used for the album. In addition, the miniature photo image in which the lower right corner portion is folded is placed after the arrangement of miniature photo images corresponding to photo images which have not been used. Thus, an operation for selecting a photo images which has not been used for the album is improved.

Further, in a case where information about respective photo images and/or components is changed, such as a case where a photo image and/or a component set on the mount are enlarged/reduced or moved, terms corresponding to photo information and/or component information in the album information file are updated. The electronic photo album editing apparatus manages respective albums, photo-boxes and information (photo data, component data and the like) belonging to respective photo-boxes, with reference to the album management file, the album directory including album editing information updated as described above, the photo management file, the picture directory, the component management file and the component directory (see FIGS. 34, 35 and 36).

The present invention is not limited to the aforementioned embodiments, and other variations and modifications may be made without departing from the scope of the claimed invention.

What is claimed is:

1. An electronic photo album editing apparatus in which photo images are set on a mount displayed on a screen of a display unit so that an electronic photo album is edited, said electronic photo album editing apparatus comprising:

input means for inputting photo images and for setting a name of a photo group to which the photo images belong, the photo group being selected from among a plurality of photo groups;

management means for managing to what photo group the photo images input by said input means belong;

display control means for causing, with reference to information obtained by said management means, photo images belonging to a photo group specified among the plurality of photo groups to be displayed on the screen; and editing means for editing an electronic photo album using photo images displayed on the screen, wherein
   said display control means causes the photo images to be displayed on the screen in a state where photo images which have been used for an electronic photo album are distinguished by appearance from photo images which have not been used for an electronic photo album.

2. The electronic photo album editing apparatus as claimed in claim 1, wherein said display control means has means for causing a list of photo groups which have been set by said input means to be displayed on the screen, photo images belonging to a photo group selected from the list of the photo groups being displayed on the screen, and wherein said editing means has means for executing a process corresponding to a request for one of deletion and movement of a photo image displayed on the screen.

3. The electronic photo album editing apparatus as claimed in claim 1, wherein said input means inputs photo images supplied from a recording medium, other than the photo images supplied from said image reading means.

4. The electronic photo album editing apparatus as claimed in claim 1, wherein said input means inputs video images supplied from an external video unit, other than the photo images supplied from said image reading means.

5. The electronic photo album editing apparatus as claimed in claim 1, further comprising:

shape management means for managing a trimming shape of a photo image using vector data;

generating means for, when one of a trimming request is issued for a photo image and when a request for one of enlarging and reducing a trimmed photo image is issued, generating a trimming shape having a specified size based on the vector data used in said shape management means;

specifying means for, when a trimming request is issued for a photo image, specifying a part of the photo image included in the trimming shape generated by said generating means, and for, when the request for one of enlarging and reducing a trimmed photo image is issued, specifying a part of one of an enlarged and reduced image included in the trimming shape, the one of enlarged and reduced image being obtained by said one of enlarging and reducing an original photo image of the trimmed photo image; and setting means for setting the part of the photo image specified by said specifying means on the mount.

6. The electronic photo album editing apparatus as claimed in claim 5, said setting means sets an outline, having a thickness, of the trimming shape on the mount.

7. An electronic photo album editing apparatus in which photo images are set on a mount displayed on a screen of a display unit so that an electronic photo album is edited, said electronic photo album editing apparatus comprising:

input means for inputting photo images and for setting a name of a photo group to which the photo images belong, the photo group being selected from among a plurality of photo groups;

management means for managing to what photo group the photo images input by said input means belong;

display control means for causing, with reference to information obtained by said management means, photo images belonging to a photo group specified among the plurality of photo groups to be displayed on the screen; and editing means for editing an electronic photo album using photo images displayed on the screen, wherein said display control means causes the photo images to be display on the screen in a state where photo images which have not been used for an electronic album are preferred to photo images which have been used for an electronic photo album.

8. The electronic photo album editing apparatus as claimed in claim 7, wherein said display control means has means for causing a list of photo groups which have been set by said input means to be displayed on the screen, photo images belonging to a photo group selected from the list of the photo groups being displayed on the screen, and wherein said editing means has means for executing a process corresponding to a request for one of deletion and movement of a photo image displayed on the screen.

9. The electronic photo album editing apparatus as claimed in claim 7, wherein said input means inputs photo images supplied from a recording medium, other than the photo images supplied from said image reading means.

10. The electronic photo album editing apparatus as claimed in claim 7, wherein said input means inputs video images supplied from an external video unit, other than the photo images supplied from said image reading means.

11. An electronic photo album editing apparatus provided in a computer system in which photo images and decorative components are set on a mount displayed on a screen of a display unit so that an electronic photo album is edited, said electronic photo album editing apparatus comprising:

detecting means for detecting whether a request for one of enlarging and reducing an object set on the mount has been issued;

determining means for, when said detecting means detects the request for one of enlarging and reducing the object on said mount, determining whether the object is one of a photo image and a decorative component; and enlarging/reducing means for, when said determining means determines that the object is a photo image, one of enlarging and reducing the photo image without changing a ratio of length to width, and for, when said determining means determines that the object is a decorative component, providing one of an enlarging and reducing process to the decorative component in accordance with a specified manner.

12. The electronic photo album editing apparatus as claimed in claim 11, further comprising:

deletion detecting means for detecting whether a deleting request is issued for an object set on the mount;

display control means for, when said deletion detecting means detects that the deleting request is issued for an object set on the mount, providing information displayed on the screen that the object will be deleted;

deleting means for, when an executing instruction is issued, deleting the object from the screen.

13. An electronic photo album editing apparatus provided in a computer system in which photo images and a photo frame component for a photo image are set on a mount displayed on a screen of a display unit so that an electronic photo album is edited, said electronic photo album editing apparatus comprising:

detecting means for detecting whether a photo image should be placed on the photo frame component set on the mount;

setting means for setting an owner-member relationship between the photo frame component and the photo image placed on the photo frame component;

first determining means for, when a request for one of moving and rotating the photo frame component is issued, determining whether there is an owner-member relationship between the photo frame component and a photo image; and moving/rotating means for, when said first determining means determines that there is the owner-member relationship between the photo frame component and a photo image, providing for one of moving and rotating the photo frame component along with the photo image.

14. The electronic photo album editing apparatus as claimed in claim 13 further comprising:

second determining means for, when a request is issued for enlarging the photo image set on the mount, determining whether there is the owner-member relationship between a photo frame component and the photo image; and limiting means for, when said second determining means determines that there is the owner-member relationship between a photo frame component and the photo image, limiting a size of a enlarged photo image so that the size of the enlarged photo image is prevented from exceeding a size of the photo frame.

15. The electronic photo album editing apparatus as claimed in claim 13 further comprising:

second determining means for, when a request for reducing the photo frame component set on the mount is issued, determining whether there is the owner-member relationship between the photo frame component and a photo image; and limiting means for, when said second determining means determines that there is the owner-member relationship between the photo frame component and a photo image, limiting a size of a reduced photo frame component so that a size of the photo image is prevented from exceeding the size of the reduced photo frame component.

16. An electronic photo album editing apparatus provided in a computer system in which photo images and decorative components are set on a mount displayed on a screen of a display unit so that an electronic photo album is edited, said electronic photo album editing apparatus comprising:

detecting means for detecting a trace of movement of a mark which can be moved on the screen by an operation unit;

storage means for, when a pen input mode is issued, storing data corresponding to the trace detected by said detecting means;

deleting means for, when a pen deleting mode is issued, deleting data corresponding to the trace detected by said detecting means from said storage means; and display control means for causing images corresponding to data stored in said storage means to be displayed on an uppermost layer of the screen.

* * * * *